US011949826B2

(12) United States Patent
Suzuki et al.

(10) Patent No.: US 11,949,826 B2
(45) Date of Patent: Apr. 2, 2024

(54) IMAGE READING DEVICE AND IMAGE FORMING APPARATUS INCORPORATING SAME

(71) Applicants: Rie Suzuki, Kanagawa (JP); Tatsuya Ishii, Kanagawa (JP)

(72) Inventors: Rie Suzuki, Kanagawa (JP); Tatsuya Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/864,767

(22) Filed: Jul. 14, 2022

(65) Prior Publication Data
US 2023/0113044 A1    Apr. 13, 2023

(30) Foreign Application Priority Data

Oct. 8, 2021  (JP) .................................. 2021-166011

(51) Int. Cl.
*H04N 1/00*    (2006.01)

(52) U.S. Cl.
CPC ..... *H04N 1/00594* (2013.01); *H04N 1/00037* (2013.01); *H04N 1/00039* (2013.01); *H04N 1/00588* (2013.01); *H04N 1/00602* (2013.01)

(58) Field of Classification Search
CPC ............. G03G 15/5062; G03G 15/607; G03G 15/6567; G03G 15/5004; G03G 15/5025; G03G 15/5029; G03G 15/5041; G03G 15/55; G03G 15/556; G03G 15/6561; G03G 15/6564; G03G 15/6573; G03G 15/80; G03G 21/1652; G03G 21/1857;
(Continued)

(56) References Cited

U.S. PATENT DOCUMENTS 6,868,175 B1 *   3/2005   Yamamoto ............. G06F 18/00
                                                    382/145
7,577,310 B2 *   8/2009   Kinjo ..................... G06V 40/16
                                                    382/118
(Continued)

FOREIGN PATENT DOCUMENTS

JP          8-328431        12/1996
JP       2005-316550 A      11/2005
(Continued)

OTHER PUBLICATIONS

Gebhardt, J. et al. "Document Authentication Using Printing Technique Features and Unsupervised Anomaly Detection." 2013 12th International Conference on Document Analysis and Recognition, IEEE, Aug. 25, 2013 (pp. 479-483).
(Continued)

*Primary Examiner* — Negussie Worku
(74) *Attorney, Agent, or Firm* — Harness, Dickey & Pierce, P.L.C.

(57)    ABSTRACT

An image reading device includes a sensor and circuitry. The sensor reads an image on a recording medium. The circuitry inspects the image and outputs an inspection result. The circuitry excludes an area of the recording medium as a first area from an area to be inspected, based on a type of the recording medium or a position of the recording medium with respect to a reading position at which the sensor reads the image, to determine a second area to be inspected. The circuitry outputs the inspection result based on the second area.

11 Claims, 15 Drawing Sheets

(58) Field of Classification Search
CPC .......... G03G 2215/00405; G03G 2215/00561; G03G 2215/0129; G03G 2215/0158; H04N 1/00819; H04N 1/00702; H04N 1/00761; H04N 2201/0094; H04N 1/00018; H04N 1/0032; H04N 1/0057; H04N 1/00718; H04N 1/00734; H04N 1/00745; H04N 1/00774; H04N 1/00801; H04N 1/3878; H04N 1/00013; H04N 1/00034; H04N 1/00037; H04N 1/00045; H04N 1/00063; H04N 1/00092; H04N 1/00278; H04N 1/00411; H04N 1/0066; H04N 1/00708; H04N 1/00713; H04N 1/00716; H04N 1/00721; H04N 1/00724; H04N 1/00748; H04N 1/00766; H04N 1/00779; H04N 1/00785; H04N 1/00795; H04N 1/00798; H04N 1/00809; H04N 1/00811; H04N 1/00816; H04N 1/00824; H04N 1/02409; H04N 1/02481; H04N 1/0249; H04N 1/02815; H04N 1/04; H04N 1/0405; H04N 1/0408; H04N 1/0414; H04N 1/0449; H04N 1/0458; H04N 1/047; H04N 1/0473; H04N 1/053; H04N 1/1235; H04N 1/1903; H04N 1/1933; H04N 1/387; H04N 1/3876; H04N 1/3877; H04N 1/401; H04N 1/4076; H04N 1/4095; H04N 1/4097; H04N 1/6005; H04N 1/6008; H04N 1/6033; H04N 2201/0006; H04N 2201/0081; H04N 2201/0098; H04N 2201/044; H04N 2201/0448; H04N 2201/04715; H04N 2201/04789; H04N 2201/04791; H04N 2201/04793; B65H 2553/416; B65H 7/10; B65H 7/14; B65H 2220/01; B65H 2220/02; B65H 2220/03; B65H 2511/13; B65H 2511/22; B65H 2511/24; B65H 2511/512; B65H 2511/521; B65H 2513/52; B65H 2553/414; B65H 2553/82; B65H 2557/50; B65H 2701/1311; B65H 2701/1313; B65H 5/02; B65H 5/06; B65H 5/068; B65H 7/06; B65H 7/20; G06K 15/027; G06K 15/1842; G06K 15/1843; G06T 2207/10008; G06T 2207/30144; G06T 2207/30176; G06T 7/13; G06T 7/33; G06T 7/337; G06T 7/73; G01J 3/52
USPC ....................................................... 358/471
See application file for complete search history.

(56) References Cited

U.S. PATENT DOCUMENTS

| | | | | |
|---|---|---|---|---|
| 7,660,455 | B2* | 2/2010 | Yamamoto | G06V 10/754 382/209 |
| 10,788,777 | B2* | 9/2020 | Ikuta | G06F 3/1208 |
| 2012/0062929 | A1 | 3/2012 | Ishii et al. | |
| 2013/0016154 | A1* | 1/2013 | Imamura | G01N 21/8903 348/135 |
| 2014/0205180 | A1* | 7/2014 | Chung | G06T 7/0006 382/149 |
| 2014/0268207 | A1 | 9/2014 | Fukase et al. | |
| 2015/0212476 | A1 | 7/2015 | Ishii et al. | |
| 2016/0059599 | A1* | 3/2016 | Kyoso | B41J 2/16585 347/19 |
| 2016/0173715 | A1 | 6/2016 | Suzuki et al. | |
| 2016/0182753 | A1 | 6/2016 | Takahashi et al. | |
| 2017/0353611 | A1* | 12/2017 | Koyama | G03G 15/602 |
| 2018/0157617 | A1 | 6/2018 | Shibata et al. | |
| 2019/0163112 | A1* | 5/2019 | Nikaku | G06T 7/337 |
| 2019/0166274 | A1 | 5/2019 | Ishii et al. | |
| 2019/0166275 | A1 | 5/2019 | Ishii et al. | |
| 2019/0300310 | A1 | 10/2019 | Ishii et al. | |
| 2020/0096925 | A1* | 3/2020 | Ikuta | G03G 15/5041 |
| 2020/0099812 | A1 | 3/2020 | Ishii et al. | |
| 2020/0106907 | A1 | 4/2020 | Hirano et al. | |
| 2020/0234422 | A1* | 7/2020 | Esumi | H04N 1/00005 |
| 2020/0234423 | A1* | 7/2020 | Oki | G06T 7/001 |
| 2020/0234456 | A1* | 7/2020 | Mita | G06V 10/44 |
| 2020/0250805 | A1* | 8/2020 | Tsukamoto | G06T 7/0002 |
| 2021/0080888 | A1 | 3/2021 | Ishii et al. | |
| 2021/0097357 | A1 | 4/2021 | Katoh et al. | |
| 2021/0150113 | A1 | 5/2021 | Shibata et al. | |
| 2021/0163247 | A1 | 6/2021 | Suzuki et al. | |
| 2021/0218860 | A1 | 7/2021 | Nikaku et al. | |
| 2021/0266423 | A1 | 8/2021 | Ishii et al. | |
| 2021/0385337 | A1* | 12/2021 | Takayama | H04N 1/00068 |
| 2022/0028047 | A1* | 1/2022 | Mashiko | H04N 1/00034 |
| 2022/0109776 | A1 | 4/2022 | Ishii et al. | |
| 2022/0109780 | A1* | 4/2022 | Suzuki | H04N 1/6008 |
| 2022/0286576 | A1* | 9/2022 | Ishitsuka | H04N 1/32625 |

FOREIGN PATENT DOCUMENTS

| | | |
|---|---|---|
| JP | 2013-072846 | 4/2013 |
| JP | 2014-199248 | 10/2014 |
| JP | 2020-053761 | 4/2020 |
| JP | 2020-091792 | 6/2020 |

OTHER PUBLICATIONS

Extended European Search Report dated Jan. 4, 2023 issued in corresponding European Appln. No. 22183841.0.
U.S. Appl. No. 17/570,904, filed Jan. 7, 2022, Nobuyoshi Kaima, et al.
U.S. Appl. No. 17/587,300, filed Jan. 28, 2022, Kohta Aoyagi, et al.
U.S. Appl. No. 17/665,931, filed Feb. 7, 2022, Ryoh Ishitsuka, et al.
U.S. Appl. No. 17/678,475, filed Feb. 23, 2022, satoshi nakayama, et al.
U.S. Appl. No. 17/682,218, filed Feb. 28, 2022, Kimiharu Yamazaki, et al.
U.S. Appl. No. 17/560,988, filed Dec. 23, 2021, Kimiharu Yamazaki, et al.

* cited by examiner

IMAGE READING DEVICE AND IMAGE FORMING APPARATUS INCORPORATING SAME

CROSS-REFERENCE TO RELATED APPLICATION

This patent application is based on and claims priority pursuant to 35 U.S.C. § 119(a) to Japanese Patent Application No. 2021-166011, filed on Oct. 8, 2021, in the Japan Patent Office, the entire disclosure of which is hereby incorporated by reference herein.

BACKGROUND

Technical Field

Embodiments of the present disclosure relate to an image reading device and an image forming apparatus incorporating the image reading device.

Related Art

An image forming apparatus may fail to form an intended image on a recording medium such as a sheet of paper due to an unexpected factor. Some techniques have been proposed that read an image formed and inspects the quality of the formed image.

For example, an image inspecting apparatus firstly sets an end portion of, e.g., a sheet as an image inspection exclusion area to be excluded from an inspection target. According to the setting, the image inspecting apparatus performs inspection excluding the end portion of the sheet. The image inspecting apparatus thus performs inspection excluding an area that is susceptible to erroneous detection, to prevent erroneous detection due to, e.g., the deformation of the sheet in the image inspection. An example of the deformation of the sheet is bending, which is so-called "twisting" at the end portion of the sheet. Such a technique has been proposed that prevents erroneous detection in image inspection.

SUMMARY

In one embodiment of the present disclosure, the image reading device includes a sensor and circuitry. The sensor reads an image on a recording medium. The circuitry inspects the image and outputs an inspection result. The circuitry excludes an area of the recording medium as a first area from an area to be inspected, based on a type of the recording medium or a position of the recording medium with respect to a reading position at which the sensor reads the image, to determine a second area to be inspected. The circuitry outputs the inspection result based on the second area.

There is also provided an image forming apparatus incorporating the image reading device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
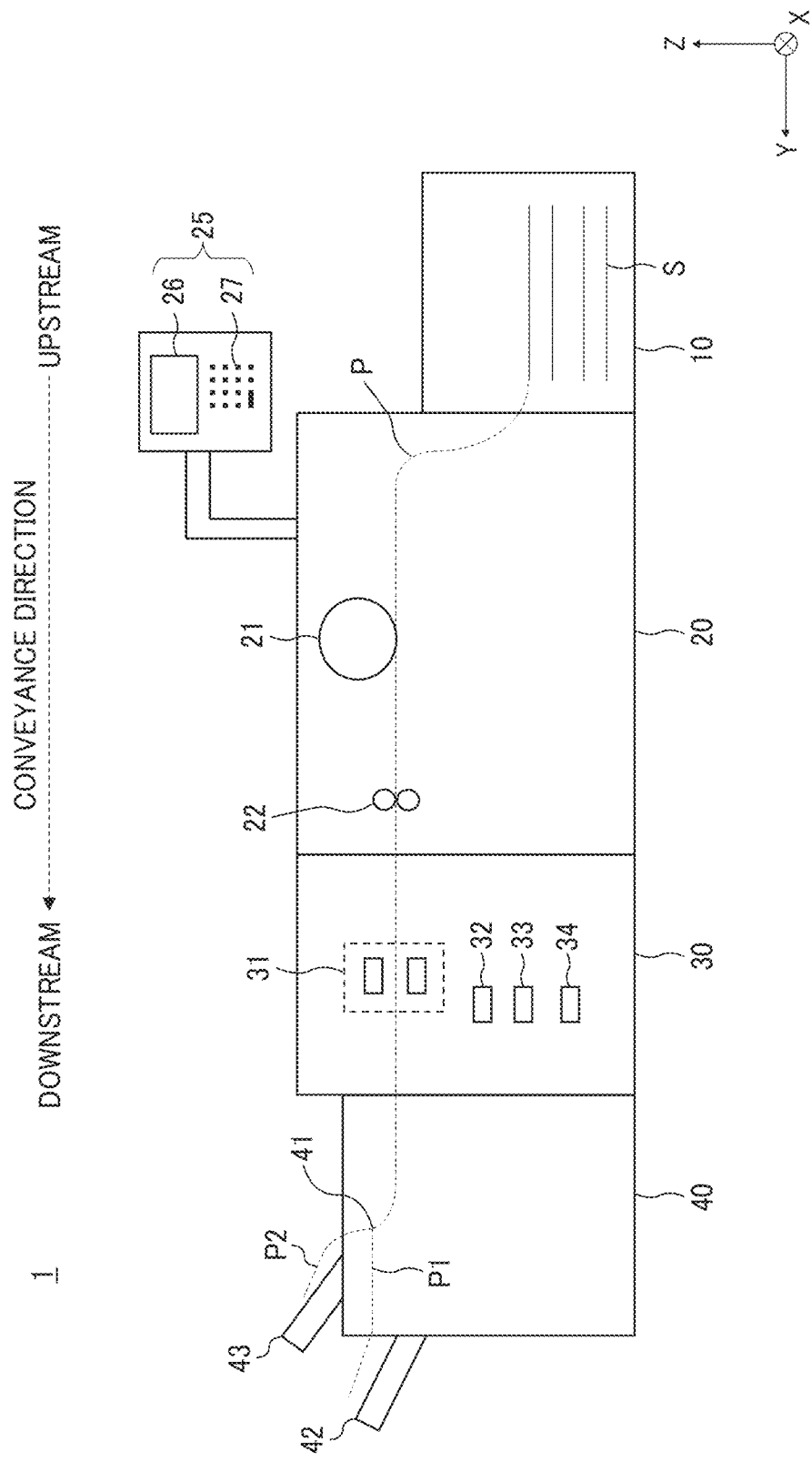
FIG. 1 is a diagram illustrating an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

As used herein, the term "connected/coupled" includes both direct connections and connections in which there are one or more intermediate connecting elements.

Now, a description is given of a first embodiment of the present disclosure.

Initially with reference to FIG. 1, a description is given of an overall configuration of an image forming apparatus according to the first embodiment.

FIG. 1 is a diagram illustrating an overall configuration of an image forming apparatus.

In the following description, a "Y direction" refers to a recording medium conveyance direction in which a recording medium is conveyed. The recording medium conveyance direction may be referred to simply as the conveyance direction. An "X direction" refers to a direction perpendicular to the conveyance direction. A "Z direction" refers to a direction perpendicular to an X-Y plane.

For example, as illustrated in FIG. 1, an image forming apparatus 1 includes an image forming device 20, a sheet feeding device 10, an image reading device 30, and a post-processing device 40.

The image forming device 20 forms an image on a sheet S as a recording medium according to input image data.

The sheet feeding device 10 supplies the sheet S to the image forming device 20.

The image reading device 30 reads the sheet S output from the image forming device 20. Specifically, the image reading device 30 reads the image formed on the sheet S.

The post-processing device 40 includes, e.g., a plurality of output trays. In the present embodiment, the post-processing device 40 includes a first output tray 42 and a second output tray 43.

In the image forming apparatus 1, the sheet feeding device 10, the image forming device 20, the image reading device 30, and the post-processing device 40 are physically coupled in this order in the conveyance direction (i.e., leftward in FIG. 1). The plurality of devices, namely, the sheet feeding device 10, the image forming device 20, the image reading device 30, and the post-processing device 40 thus coupled construct the image forming apparatus 1. Accordingly, in the image forming apparatus 1, a conveyance passage P through which the sheet S is conveyed is defined by the internal components of the plurality of devices of the image forming apparatus 1. The conveyance passage P is branched by a sorter 41 of the post-processing device 40 into a first path P1 to the first output tray 42 located below and a second path P2 to the second output tray 43 located above.

Although the conveyance passage P is indicated by a single line in FIG. 1, the image forming apparatus 1 may include a conveyance passage for duplex printing, for example. The passage for outputting the sheet S may be branched into three or more passages, depending on the number of output trays, for example.

The sheet feeding device 10 accommodates the sheets S in various sizes or types. The sheet feeding device 10 includes, e.g., a sheet feeding roller that feeds the accommodated sheets S one by one and a motor that drives the sheet feeding roller.

The image forming device 20 includes, e.g., a forming device 21 that forms an image by an intermediate transfer method with an electrophotographic process technique.

Specifically, first, the forming device 21 primarily transfers, onto an intermediate transfer belt, toner images in different colors such as yellow (Y), magenta (M), cyan (C), and black (K) formed on drum-shaped photoconductors so that the toner images in the four colors are superimposed one atop another as a composite image on the intermediate transfer belt. Thereafter, the forming device 21 secondarily transfers the composite toner image onto the sheet S. Thus, the forming device 21 forms the toner image on the sheet S.

The image forming device 20 further includes a fixing device 22 downstream from the forming device 21 in the conveyance direction. The fixing device 22 applies heat and pressure to the sheet S to fix the toner image onto the sheet S.

The image forming method and the configuration of the image forming device 20 may be other than those described above.

The image forming device 20 further includes an operation display 25. The operation display 25 is, e.g., a liquid crystal display (LCD) with a touch panel. Specifically, the operation display 25 includes, e.g., a display 26 and an operation device 27.

The display 26 displays, e.g., an operation screen, the state of an image, and the operation state of each function according to a display control signal.

The operation device 27 includes, e.g., a numeric keypad and a start key. The operation device 27 receives an input operation from a user and outputs an operation signal to, e.g., a control device.

The display 26 may display an icon with, e.g., a cursor or a pointer on a screen and output an operation signal to, e.g., the control device in res pose to an input operation from the user.

The image forming device 20 may further include an image processing device that performs correction such as gradation correction on input image data. The image forming device 20 may further include a sheet conveying device that drives a conveying roller or a communication device that communicates with an external device through a communication network.

The image forming device 20 may further have a configuration as a copier that copies a document on the sheet S. For example, the image forming device 20 may include an automatic document feeder (ADF) and a scanner that scans the document.

The image reading device 30 includes an output image reading device 31 that optically reads an image formed on the sheet S. Specifically, the output image reading device 31 reads one side or both sides of the sheet S with a sensor such as a charge coupled device (CCD). Based on the reading result provided by the sensor, the output image reading device 31 generates read image data.

The image reading device 30 further includes, e.g., a calculation device, a control device, a storage device or memory, an input device, an output device, and a communication device to process, e.g., an image acquired with the sensor. The image reading device 30 includes, e.g., a central processing unit (CPU) 32, a read only memory (ROM) 33, and a random access memory (RAM) 34.

The CPU 32 serves as the arithmetic device and the control device.

The ROM 33 and the RAM 34 serve as the storage devices or memories.

The sorter 41 includes, e.g., a switching gate that switches the output destination of the sheet S, a drive source such as a solenoid that drives the switching gate, and an interface that performs data transmission.

The post-processing device 40 may include, e.g., a cutter that cuts the sheet S, a stapler that performs stapling, and a sheet folder that folds the sheet S.

Figure 2:
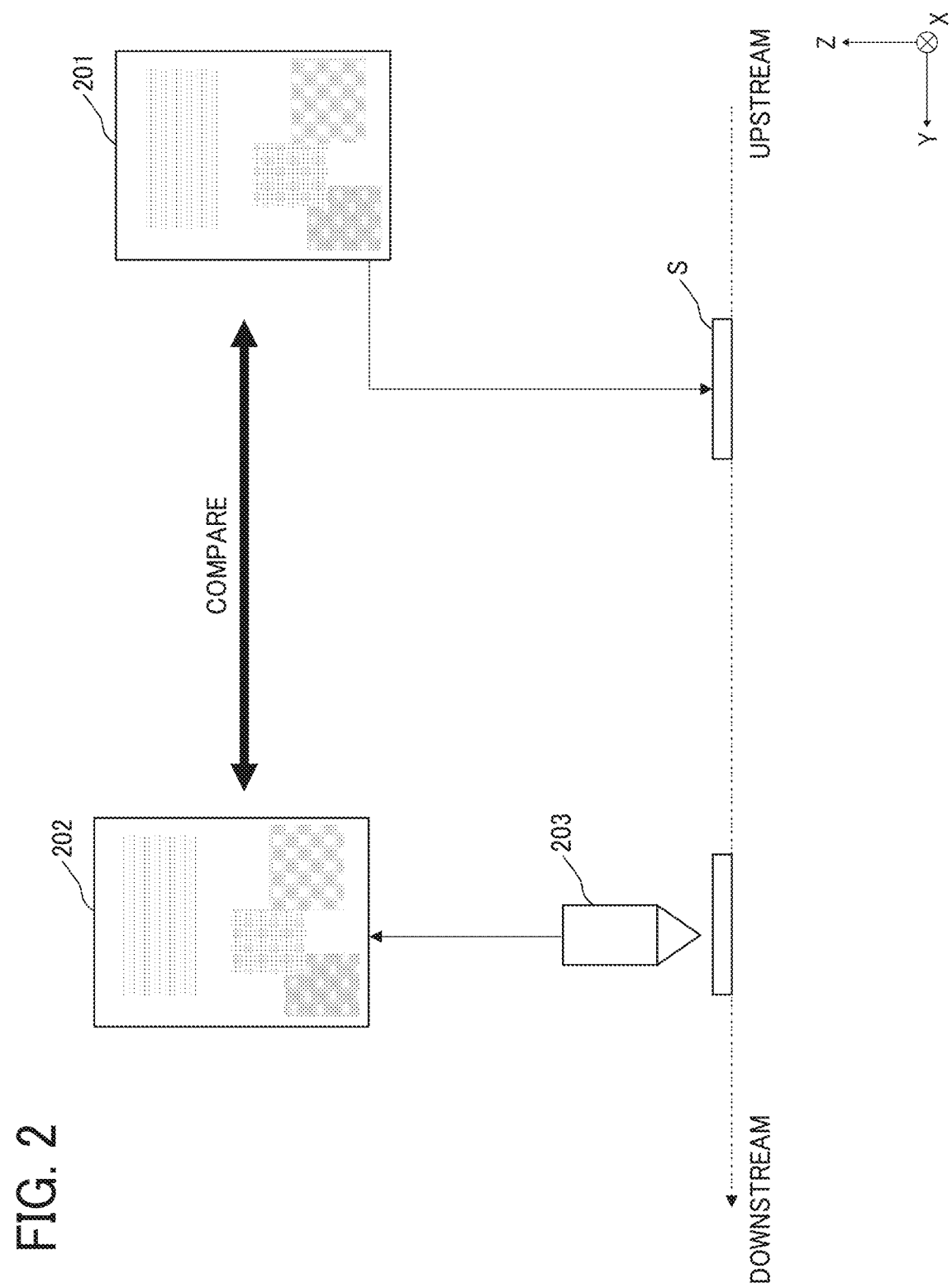
FIG. 2 is a diagram illustrating an outline of image inspection.

Referring now to FIG. 2, a description is given of an example of inspection.

FIG. 2 is a diagram illustrating an outline of image inspection.

Now, a description is given of a case in which an image is formed on the sheet S according to input image data 201, which is image data input to the image forming apparatus 1.

As illustrated in FIG. 2, after an image is formed on the sheet S according to the input image data 201, a sensor 203 that is disposed downstream in the conveyance direction (i.e., on the left side in FIG. 2) reads the image formed on the sheet S. The image reading device 30 generates, as read image data 202, image data based on the reading result provided by the sensor 203.

The read image data 202 is compared with the input image data 201 for an image inspection, which may be referred to simply as an inspection in the following description. Specifically, the image reading device 30 inspects whether the read image data 202 includes an image that is not included in the input image data 201 serving as reference data.

More specifically, the image reading device 30 inspects whether the read image data 202 includes contamination due to, e.g., toner or ink, scratches generated during conveyance, unevenness in printing, misalignment such as so-called "out of registration" or "off-registration," or a combination thereof. In short, the image reading device 30 inspects whether the read image data 202 includes, e.g., contamination. The image reading device 30 may determine whether the contamination is greater than an allowable value set in advance as a criterion for the inspection.

For example, the image inspection is implemented by image recognition. In other words, the image inspection is performed based on whether the read image data 202 matches the input image data 201. For example, the image inspection may be implemented by image recognition of dust.

Note that the input image data 201 may be generated before the inspection is performed. For example, after the input image data 201 is generated once, the input image data 201 may be used for another inspection. This reduces the processing for generating the input image data 201, resulting in reduction of the processing load.

When the read image data 202 includes, e.g., contamination, the image reading device 30 outputs an inspection result indicating the read image data 202 is abnormal. By contrast, when the read image data 202 does not include, e.g., contamination, the image reading device 30 outputs an inspection result indicating that the read image data 202 is normal.

Figure 3:
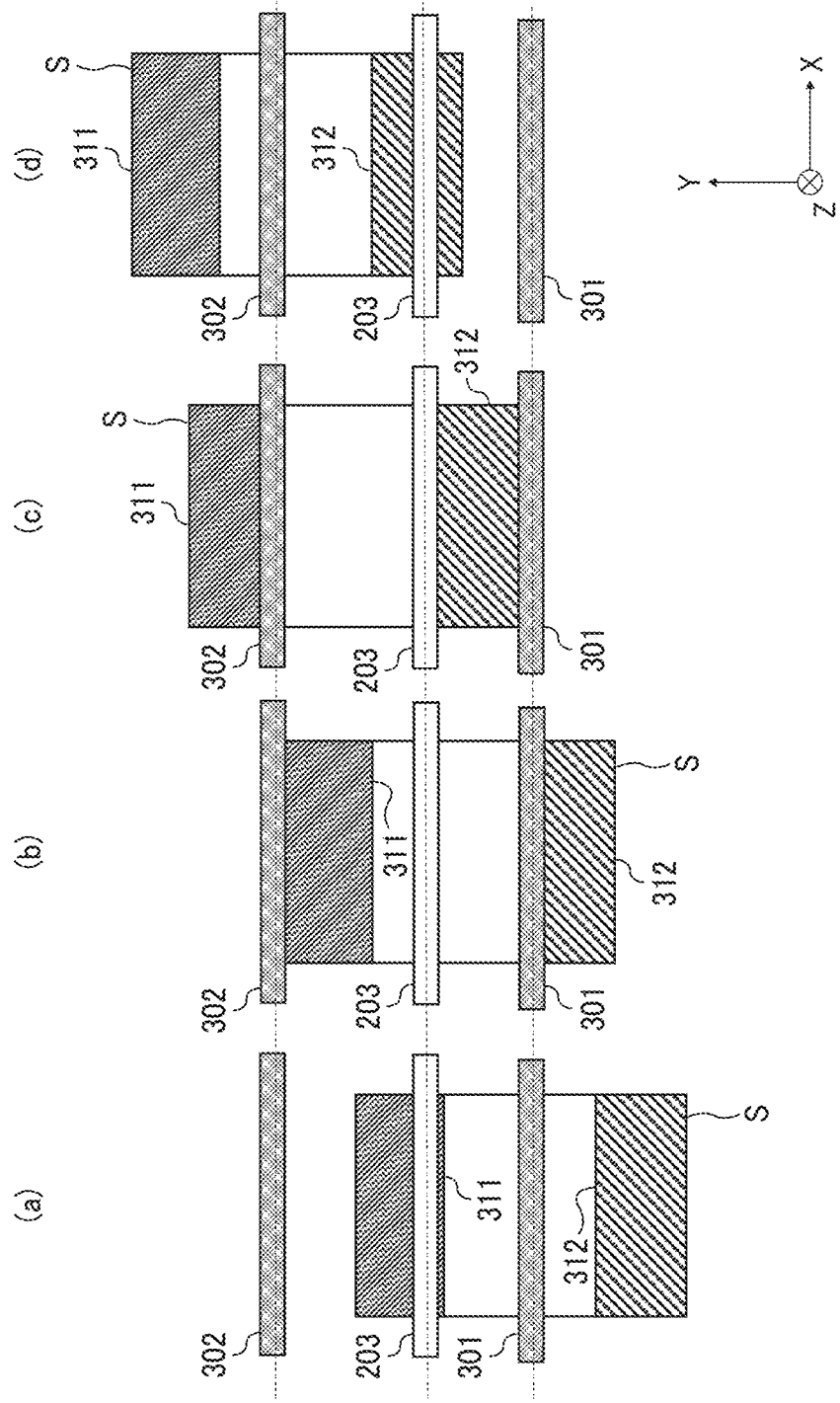
FIG. 3 is a diagram illustrating an example of area setting.

Referring now to FIG. 3, a description is given of some examples of area setting.

FIG. 3 is a diagram illustrating an example of area setting. FIG. 3 is a diagram illustrating how the conveyance state of the sheet S changes.

The image reading device 30 includes a first roller pair 301 serving as a first sandwiching conveyor and a second roller pair 302 serving as a second sandwiching conveyor. As illustrated in FIG. 3, the first roller pair 301 is located upstream from the sensor 203 in the conveyance direction (i.e., below the sensor 203 in FIG. 3); whereas the second roller pair 302 is located downstream from the sensor 203 in the conveyance direction (i.e., above the sensor 203 in FIG. 3).

Now, a description is given of a case in which the state of the sheet S changes from part (a) to part (d) of FIG. 3 while the sheet S is conveyed. In other words, parts (a) to (d) of FIG. 3 illustrate different states of the sheet S gripped by the first sandwiching conveyor and the second sandwiching conveyor.

Specifically, parts (a) and (d) of FIG. 3 illustrate the sheet S sandwiched by either the first roller pair 301 (i.e., the first sandwiching conveyor) or the second roller pair 302 (i.e., the second sandwiching conveyor). When the sheet S is not gripped by the roller pairs that define the conveyance passage P as illustrated in parts (a) and (d) of FIG. 3, the conveyance state of the sheet S is likely to be unstable and may often flap.

Specifically, in part (a) of FIG. 3, the first roller pair 301 grips the sheet S; whereas the second roller pair 302 does not grip the sheet S. In this state, for example, a leading end area 311 of the sheet S is likely to flap. Note that the leading end area 311 of the sheet S is an area at a leading end of the sheet S.

By contrast, in part (d) of FIG. 3, the second roller pair 302 grips the sheet S; whereas the first roller pair 301 does not grip the sheet S. In this state, for example, a trailing end area 312 of the sheet S is likely to flap. Note that the trailing end area 312 of the sheet S is an area at a trailing end of the sheet S.

On the other hand, parts (b) and (c) of FIG. 3 illustrate the sheet S sandwiched by both the first roller pair 301 and the second roller pair 302 and being stable.

When the image inspection is performed on the flapping sheet S, the reading accuracy of the sensor 203 may decrease. To address such a situation, the image reading device 30 performs a process of excluding an area that is likely to flap from the read image data 202 generated from the reading result provided by the sensor 203, depending on the position of the sheet S being conveyed. The "process of excluding" is a process of "excluding from inspection" with respect to a specific area in the read data provided by the sensor 203, more specifically, a process of "excluding a specific area in the read data provided by the sensor 203 from inspection." In other words, the image reading device 30 performs setting for masking part of the read image data 202. Note that the "process of excluding" may be referred to as "excluding from inspection" or "masking."

In the following description, a given area excluded from an area to be inspected may be referred to as a "first area." An area obtained by excluding the first area from the area to be inspected may be referred to as a "second area" as an area to be inspected or an inspection target area.

The first area and the second area are preferably set depending on, e.g., the state of the sheet S being conveyed. For example, in part (a) of FIG. 3, the first area is the leading end area 311. In part (d) of FIG. 3, the first area is the trailing end area 312.

As described above, preferably, the area that is likely to flap in the sheet S is excluded depending on the state of the sheet S being conveyed and the second area, which is an area other than the area excluded, is inspected. Setting the first area depending on the state of the sheet S being conveyed as described above further enhances the inspection accuracy.

Alternatively, the first area may be set depending on the existence of an image, for example. Depending on the input image data 201, an image such as a character is not formed in an area of the sheet S. In other words, such an area includes no image. In such a case, the area without an image such as a character may be set as the first area.

Alternatively, an area such as a margin may be set as the first area. In other words, the first area may include an area in which no image is formed.

The image reading device 30 may thus reduce the area to be inspected to perform inspection at high speed.

The image reading device 30 may use the area without an image such as a character to inspect whether the contamination with, e.g., toner or ink occurs.

The sizes of the leading end area 311 and the trailing end area 312 may change depending on, e.g., the type of the sheet S. For example, the degree of flapping varies depending on the hardness of the sheet S. For this reason, in a case where the sheet S is likely to flap because of the sheet type, the leading end area 311 and the trailing end area 312 may be relatively large.

In a case where the reading position is apart from the position at which the sheet S is gripped, the reading accuracy is likely to be worse due to the influence of flapping.

For this reason, the range set as the first area may be changed based on, e.g., the position of the sheet S with respect to the reading position or the type of the sheet S. Such a change enhances an accurate exclusion of an area that is difficult to read.

Note that the image reading device 30 stably conveys the sheet S with the sandwiching conveyors. Accordingly, the image reading device 30 including the sandwiching conveyors performs the inspection with high accuracy. As the image reading device 30 includes the multiple sandwiching conveyors that hold the sheet S at multiple positions, the image reading device 30 conveys the sheet S more stably than an image reading device that includes a single sandwiching conveyor. The position, number, and shape of the sandwiching conveyors are not limited to those exemplified.

Figure 4:
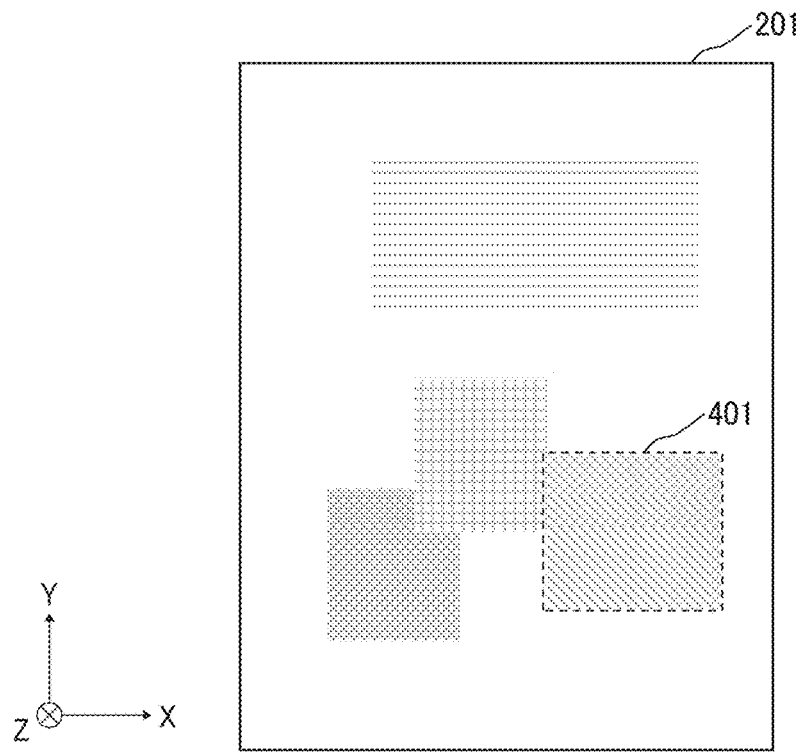
FIG. 4 is a diagram illustrating a first comparative example.
Figure 5:
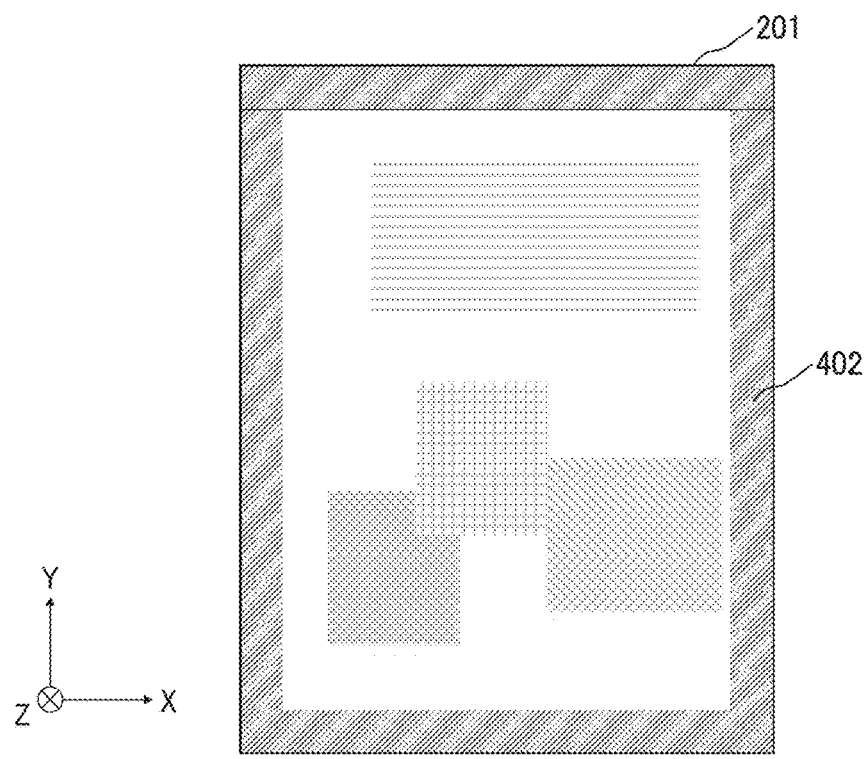
FIG. 5 is a diagram illustrating a second comparative example.

Referring now to FIGS. 4 and 5, a description is given of some comparative examples.

FIG. 4 is a diagram illustrating a first comparative example.

For example, in the first comparative example, a specific image 401 indicated by the input image data 201 is set in advance as an area to be excluded from the inspection.

FIG. 5 is a diagram illustrating a second comparative example.

For example, in the second comparative example, an end portion 402 indicated by the input image data 201 is set in advance as an area to be excluded from the inspection.

In the first comparative example and the second comparative example, the flapping or twisting of a recording medium may hamper an accurate inspection.

Typically, a user sets, in advance, an image inspection exclusion area to be excluded from an inspection target. When sheets conveyed to an image inspecting apparatus vary in posture with respect to the direction in which the sheets are conveyed or when the sheets have deformed end portions, the image inspection exclusion area set in advance is not appropriate for the sheets conveyed. As a result, an area to be set as the image inspection exclusion area may not be excluded as appropriate. In other words, the typical image inspecting apparatus may fail to sufficiently prevent erroneous detection in image inspection.

According to the present embodiment, the erroneous detection is prevented in image inspection.

Figure 6:
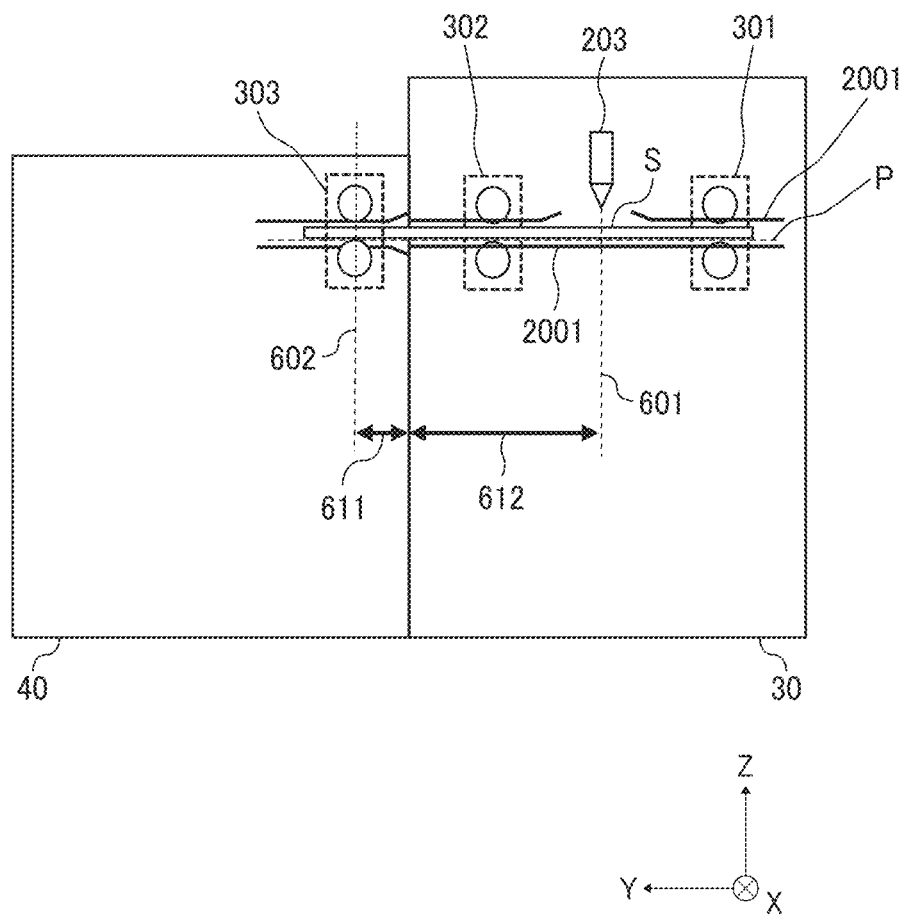
FIG. 6 is a diagram illustrating a post-processing device including a sandwiching conveyor.

Referring now to FIG. 6, a description is given of a second embodiment of the present disclosure.

FIG. 6 is a diagram illustrating a third sandwiching conveyor.

A description is now given, as an example, of the image reading device 30 and the post-processing device 40 illustrated in FIG. 1. For example, the image reading device 30 preferably changes, e.g., area setting or the determination criterion in the inspection in consideration of peripheral devices such as the post-processing device 40.

Specifically, in the present example, the post-processing device 40 includes a third roller pair 303 serving as the third sandwiching conveyor.

The sheet S is susceptible to a shock when the leading end of the sheet S enters the third roller pair 303. In other words, for example, the sheet S is likely to be deformed during the reading performed by the sensor 203 when the leading end of the sheet S is conveyed to the third roller pair 303.

In particular, when the force for conveying the sheet S changes between the image reading device 30 and the post-processing device 40, the sheet S is susceptible to a greater shock. For example, when the roller pairs included in the image reading device 30 and the post-processing device 40 have different rotational speeds, the sheet S is susceptible to a greater shock. In other words, in a case where the conveyance speed of the sheet S is different from the conveyance speed at which the leading end of the sheet S is sandwiched and conveyed by the third roller pair 303 when the leading end of the sheet S enters the third roller pair 303, the conveyance speed varies between the leading end portion of the sheet S and the other portion of the sheet S. As a result, the entire sheet S may be affected by a shock when the sheet S enters the third roller pair 303. This shock tends to deform the sheet S, for example.

The post-processing device 40 is changeable to various models. For this reason, the distance between a reading position 601 and a downstream gripping position 602, which is a position at which the sheet S is gripped by the third roller pair 303, may change depending on, e.g., the model of a peripheral device.

For example, Table 1 below presents some combinations of a first distance 611 and a second distance 612. The first distance 611 is a distance between the entrance of the post-processing device 40 in the conveyance direction and the downstream gripping position 602. The second distance 612 is a distance between the reading position 601 and the exit of the image reading device 30 in the conveyance direction.

TABLE 1

| | FIRST DISTANCE BETWEEN ENTRANCE OF POST-PROCESSING DEVICE AND THIRD ROLLER PAIR | SECOND DISTANCE BETWEEN READING POSITION AND EXIT OF IMAGE READING DEVICE | INVALID AREA |
|---|---|---|---|
| FIRST PERIPHERAL DEVICE | 40 mm | 100 mm | 140 mm ± 10 mm |
| SECOND PERIPHERAL DEVICE | 30 mm | 100 mm | 130 mm ± 10 mm |
| THIRD PERIPHERAL DEVICE | 20 mm | 100 mm | 120 mm ± 10 mm |

In the example presented in Table 1 above, the post-processing device 40 is classified into three types: "first peripheral device," "second peripheral device," and "third peripheral device."

Now, a description is given of a case in which the timing when the sheet S is conveyed to the third sandwiching conveyor is set by distance.

Alternatively, for example, the timing when the sheet S is conveyed to the third sandwiching conveyor may be set by time.

In Table 1 above, the "invalid area" indicates examples of set areas for which the inspection is invalidated. The "invalid area" is, e.g., a value obtained by adding the first distance and the second distance, in other words, a value obtained by calculating the distance between the reading position 601 and the downstream gripping position 602. Specifically, the "invalid area" is calculated as "40 mm+100 mm=140 mm" for the "first peripheral device."

The "invalid area" also includes certain areas before and after a center distance. In the example of Table 1 above, "±10 mm" is included in the "invalid area." Accordingly, the "invalid area" is "140 mm±10 mm" for the "first peripheral device."

The "invalid area" is set for an area that is inspected when the sheet S is susceptible to a shock by a peripheral device. Since the sheet S is susceptible to some failures when the sheet S is susceptible to a shock, the inspection is invalidated. In other words, the image reading device 30 stops the inspection of the "invalid area" or ignores an abnormality detected in the inspection of the "invalid area."

Note that the criterion for determining the abnormality may be changed for the invalidation of the inspection. For example, the inspection for the "invalid area" may be performed based on a criterion different from a criterion for other areas. Specifically, when the tint is inspected, the tint may be determined normal in the inspection for the "invalid area" though the difference between an ideal color and a color inspected is larger than that in the other areas.

When the shape of the sheet S is inspected, a sub-scanning magnification of an image to be inspected may change because the sheet S is conveyed slowly or quickly. As a result, the image may be determined abnormal in the inspection. For this reason, the criterion for the image reading device 30 to determine the abnormality in the "invalid area" is preferably looser than that in the other areas.

Thus, invalidating the inspection in consideration of the third sandwiching conveyor reduces erroneous detection.

In the example of Table 1 above, the "invalid area" is set based on the position of the third roller pair 303. Alternatively, for example, the "invalid area" may be set based on the entrance of the post-processing device 40 in the conveyance direction.

The determination criterion for the inspection is set by, e.g., a graphical user interface (GUI) described below.

Figure 7:
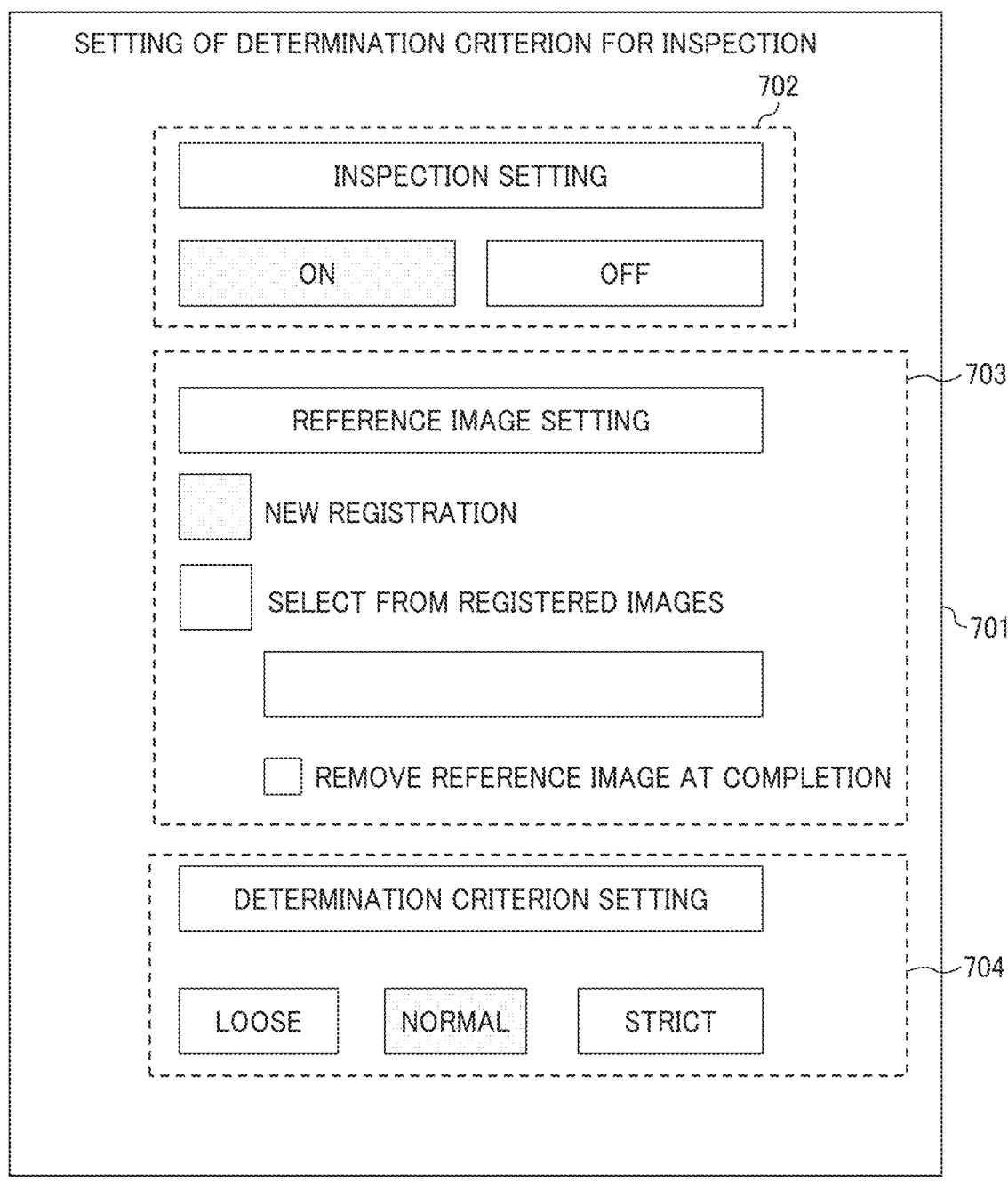
FIG. 7 is a diagram illustrating a setup screen.

FIG. 7 is a diagram illustrating a setup screen.

For example, the determination criterion for the inspection is set by a user operation on a setup screen 701. The setup screen 701 includes, e.g., an inspection setting button 702, a reference image setting button 703, and a determination criterion setting button 704.

The inspection setting button 702 is a GUI that receives an operation of determining whether to perform an inspection.

The reference image setting button 703 is a GUI with which an image as a reference for the inspection, which is the input image data 201, is set.

The determination criterion setting button 704 is a GUI with which a determination criterion for the inspection is set. In the example illustrated in FIG. 7, the determination criterion for the inspection is selected from three levels of "loose," "normal," and "strict."

Note that the number of levels from which the determination criterion for the inspection is selected is not limited to three. The determination criterion for the inspection thus set prevents erroneous detection of, e.g., fiber of the sheet S.

To enhance the user-friendliness, a variable area in which different images such as different addresses are formed for multiple sheets S may be excluded from the inspection.

For the items set as described above, the abnormality such as contamination or image missing is inspected. The inspected sheet S is discharged to, e.g., a given tray. When the image on the sheet S is determined as abnormal in the inspection, the image forming device 20 may form an image on a sheet S other than the sheet S bearing the abnormal image. In short, the image forming device 20 may perform so-called recovery printing.

Note that the screen for setting is not limited to the configuration of the setup screen 701. In other words, the determination criterion for the inspection may be set by another setting way other than the way of setting through the setup screen 701.

Now, a description is given of a third embodiment of the present disclosure.

Figure 8:
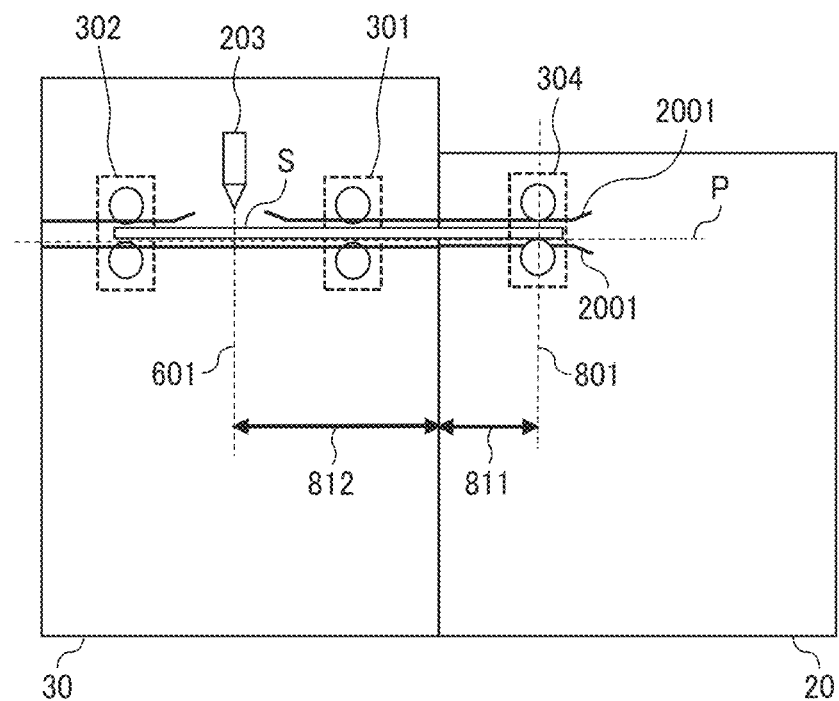
FIG. 8 is a diagram illustrating an image forming device including a sandwiching conveyor.

FIG. 8 is a diagram illustrating a fourth sandwiching conveyor.

A description is now given, as an example, of the image reading device 30 and the image forming device 20 illustrated in FIG. 1. For example, the image reading device 30 preferably changes, e.g., area setting or the determination criterion in the inspection in consideration of peripheral devices such as the image forming device 20.

The image reading device 30 may inspect the sheet S bearing an image formed by a device other than the image forming device 20. The device located upstream from the image reading device 30 in the conveyance direction may be another type of device other than the image forming device 20.

Specifically, in the present example, the image forming device 20 includes a fourth roller pair 304 serving as a fourth sandwiching conveyor.

Like the second embodiment, the sheet S is susceptible to a shock when the trailing end of the sheet S passes through the fourth roller pair 304. In other words, for example, the sheet S is likely to be deformed during the reading performed by the sensor 203 when the trailing end of the sheet S is conveyed from the fourth roller pair 304.

In particular, when the force for conveying the sheet S changes between the image reading device 30 and the image forming device 20, the sheet S is susceptible to a greater shock. For example, when the roller pairs included in the image reading device 30 and the image forming device 20 have different rotational speeds, the sheet S is susceptible to a greater shock.

The image forming device 20 is changeable to various models. For this reason, the distance between an upstream gripping position 801, which is a position at which the sheet S is gripped by the fourth roller pair 304, and the exit of the image forming device 20 in the conveyance direction may change depending on, e.g., the model of a peripheral device.

For example, Table 2 below presents some combinations of a third distance 811 and a fourth distance 812. The third distance 811 is a distance between the upstream gripping position 801 and the exit of the image forming device 20 in the conveyance direction. The fourth distance 812 is a distance between the entrance of the image reading device 30 in the conveyance direction and the reading position 601.

TABLE 2

| | THIRD DISTANCE BETWEEN FOURTH ROLLER PAIR AND EXIT OF IMAGE FORMING DEVICE | FOURTH DISTANCE BETWEEN ENTRANCE OF IMAGE READING DEVICE AND READING POSITION | INVALID AREA |
|---|---|---|---|
| FOURTH PERIPHERAL DEVICE | 40 mm | 90 mm | 130 mm ± 10 mm |

TABLE 2-continued

| | THIRD DISTANCE BETWEEN FOURTH ROLLER PAIR AND EXIT OF IMAGE FORMING DEVICE | FOURTH DISTANCE BETWEEN ENTRANCE OF IMAGE READING DEVICE AND READING POSITION | INVALID AREA |
|---|---|---|---|
| FIFTH PERIPHERAL DEVICE | 30 mm | 90 mm | 120 mm ± 10 mm |
| SIXTH PERIPHERAL DEVICE | 20 mm | 90 mm | 110 mm ± 10 mm |

In the example presented in Table 2 above, the image forming device 20 or another type of device is classified into three types: "fourth peripheral device," "fifth peripheral device," and "sixth peripheral device."

Now, a description is given of a case in which the timing when the sheet S is conveyed from the fourth sandwiching conveyor is set by distance. Alternatively, for example, the timing when the sheet S is conveyed from the fourth sandwiching conveyor may be set by time.

In Table 2 above, the "invalid area" indicates examples of set areas for which the inspection is invalidated. The "invalid area" is, e.g., a value obtained by adding the third distance and the fourth distance, in other words, a value obtained by calculating the distance between the upstream gripping position 801 and the reading position 601. Specifically, the "invalid area" is calculated as "40 mm+90 mm=130 mm" for the "fourth peripheral device."

The "invalid area" also includes certain areas before and after a center distance. In the example of Table 2 above, "±10 mm" is included in the "invalid area." Accordingly, the "invalid area" is "130 mm±10 mm" for the "fourth peripheral device."

The "invalid area" is an area that is inspected when the sheet S is susceptible to a shock by a peripheral device.

Since the sheet S is susceptible to some failures when the sheet S is susceptible to a shock, the inspection is invalidated. In other words, the image reading device 30 stops the inspection of the "invalid area," ignores an abnormality detected in the inspection of the "invalid area," or changes the criterion for determining the abnormality for the "invalid area."

Thus, invalidating the inspection in consideration of the fourth sandwiching conveyor reduces erroneous detection.

Now, a description is given of a fourth embodiment of the present disclosure.

Figure 9:
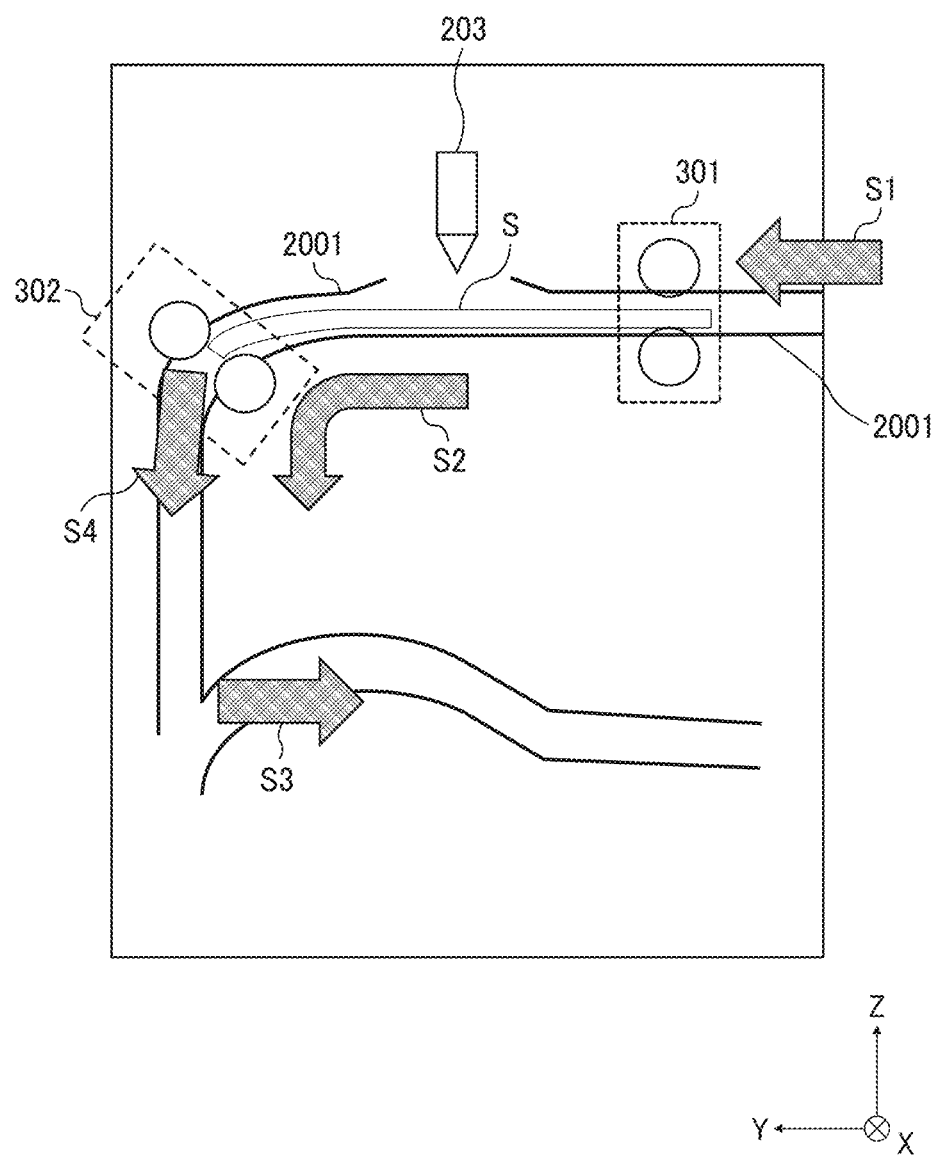
FIG. 9 is a diagram illustrating a configuration for duplex printing.

FIG. 9 is a diagram illustrating a configuration for duplex printing.

In a case where an image is formed on each side of the sheet S, after an image is formed on one side, as a front side, of the sheet S, e.g., the sensor 203 inspects the front side bearing the image as illustrated in FIG. 9. When the inspection is finished, the sheet S is reversed so that another image is formed on a back side of the sheet S, which is another side different from the front side of the sheet S, and that the sensor 203 inspects the back side of the sheet S. In the following description, a "reversing passage" refers to a conveyance passage for reversing the front and back sides of the sheet S.

When the duplex printing is performed, in other words, when the front and back sides of the sheet S are reversed, the conveyance direction includes a first direction 51, a second direction S2, a third direction S3, and a fourth direction S4.

Specifically, the first direction 51 is a direction in which the sheet S is conveyed at a position upstream from the first sandwiching conveyor in the conveyance direction. On the other hand, the second direction S2 is a direction in which the first sandwiching conveyor conveys the sheet S from the first sandwiching conveyor.

When the duplex printing is performed, the first direction 51 is different from the second direction S2. Specifically, in the example illustrated in FIG. 9, the first direction 51 is a direction in which the sheet S is conveyed from right to left in FIG. 9. On the other hand, the second direction S2 is a direction in which the sheet S is conveyed from top to bottom in FIG. 9. Thus, when the duplex printing is performed, the first direction 51 is different from the second direction S2.

The third direction S3 is a direction in which the sheet S is conveyed at a position downstream from the second sandwiching conveyor in the conveyance direction. On the other hand, the fourth direction S4 is a direction in which the second sandwiching conveyor conveys the sheet S from the second sandwiching conveyor.

When the duplex printing is performed, the third direction S3 is different from the fourth direction S4. Specifically, in the example illustrated in FIG. 9, the third direction S3 is a direction in which the sheet S is conveyed from left to right in FIG. 9. In other words, the third direction S3 is a direction toward a device that performs processing such as image formation to form an image on the back side of the sheet S. On the other hand, the fourth direction S4 is a direction in which the sheet S is conveyed from top to bottom in FIG. 9. Thus, when the duplex printing is performed, the third direction S3 is different from the fourth direction S4.

The image forming apparatus 1 conveys the sheet S through, e.g., a conveyance passage having a curvature as illustrated in FIG. 9 to turn over the sheet S from the front side to the back side. The conveyance passage having a curvature is, e.g., a conveyance passage for reversing the sheet S. Note that the curvature and shape of the conveyance passage are not limited to those illustrated in FIG. 9. For example, the conveyance passage having a curvature may be a conveyance passage that is used in a case where the height of conveyance position is different between the image forming device 20 and a peripheral device.

The sheet S is conveyed in the third direction S3 through the reversing passage. At this time, part of the sheet S tends to jump up or be lifted up in FIG. 9 near the sensor 203. As a result, the distance between the sheet S and the sensor 203 decreases. In particular, after passing through the first roller pair 301, the sheet S is likely to jump up.

When the distance between the sheet S and the sensor 203 changes as described above, e.g., the brightness changes and the appearance on the image may change. Such a change in color may cause the image reading device 30 to erroneously detect an abnormality.

When the first direction 51 is different from the second direction S2 or when the third direction S3 is different from the fourth direction S4, for example, the image reading device 30 stops the inspection, ignores an abnormality detected in the inspection, or changes the criterion for determining the abnormality, to prevent erroneous detection.

When the reversing passage is thus taken into consideration, the image reading device 30 reduces erroneous detection.

The jumping of the sheet S varies depending on the type of the sheet S. Specifically, when the sheet S is hard or thick, the sheet S is likely to jump up. In other words, the influence tends to be large. By contrast, when the sheet S is soft or thin, the sheet S is likely to be deformed along the reversing passage.

For this reason, the image reading device 30 preferably changes the criterion for determining the abnormality in consideration of the thickness, weight, or type of the sheet S. For example, the image reading device 30 changes the criterion for determining the abnormality depending on whether the sheet S is a film medium such as an overhead projector (OHP) sheet or a metallic sheet.

Now, a description is given of an example of setting a determination criterion based on a learning result.

The following setting is performed in advance to set a criterion for the image reading device 30 to determine whether the inspection result is normal or abnormal.

Figure 10:
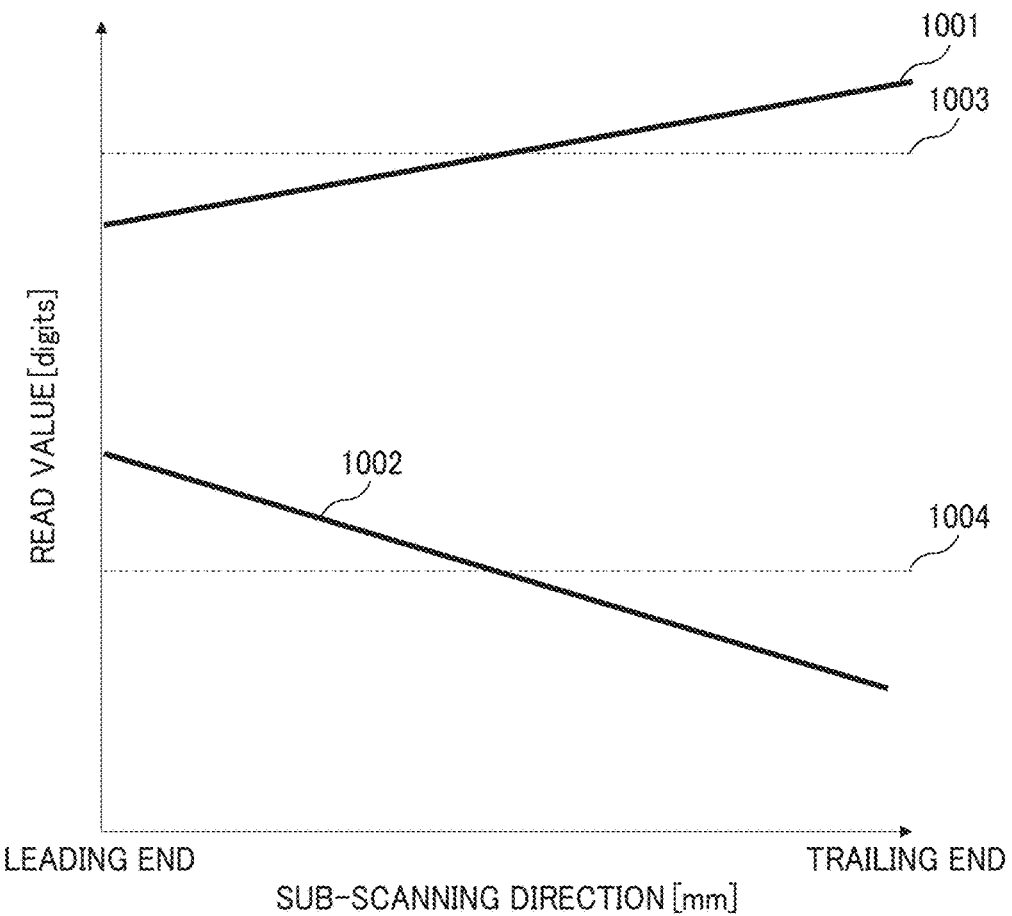
FIG. 10 is a graph illustrating an example of acquiring a sheet level.

FIG. 10 is a graph illustrating an example of acquiring a sheet level.

Now, a description is given of a case in which the image reading device 30 obtains a first reading result 1001 and a second reading result 1002 when reading two types of sheets S.

The image reading device 30 reads the sheets S conveyed before image formation.

The image reading device 30 averages the first reading result 1001 in a main scanning direction to obtain a first average value 1003.

The image reading device 30 averages the second reading result 1002 in the main scanning direction to obtain a second average value 1004.

As indicated by the first reading result 1001 and the second reading result 1002, the brightness is different between the types of the sheets S. For this reason, preferably, the normal sheet level is separately set for each type of the sheets S such as the first average value 1003 or the second average value 1004.

For example, the image reading device 30 calculates an average value such as the first average value 1003 or the second average value 1004 to obtain a reference value. As described above, since the value of, e.g., the brightness is different between the types of the sheets S, the brightness of, e.g., characters formed is also different between the types of the sheets S. For this reason, the criterion for determining whether the inspection result is normal or abnormal is preferably set based on the value acquired in advance for each type of the sheets S.

Figure 11:
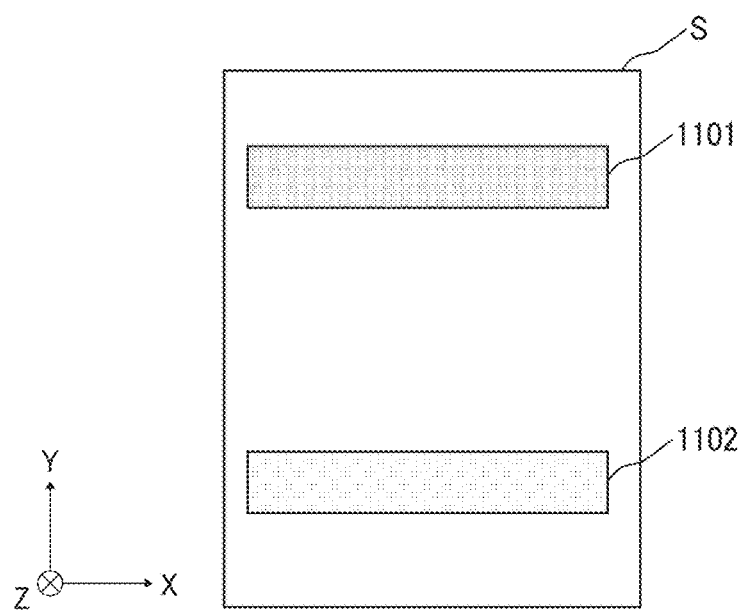
FIG. 11 is a diagram illustrating an example of change in brightness.

FIG. 11 is a diagram illustrating an example of change in brightness.

Now, a description is given of a case in which the image reading device 30 reads the brightness of the sheet S and obtains a reading result as illustrated in FIG. 11. Specifically, the result of reading the sheet S includes a dark area 1101 and a bright area 1102, which are a relatively dark area and a relatively bright area, respectively.

The dark area 1101 and the bright area 1102 occur due to, e.g., a change in the distance between the sheet S and the sensor 203. Specifically, the dark area 1101 is an area where the brightness is lower than an average. By contrast, the bright area 1102 is an area where the brightness is higher than the average.

Figure 12:
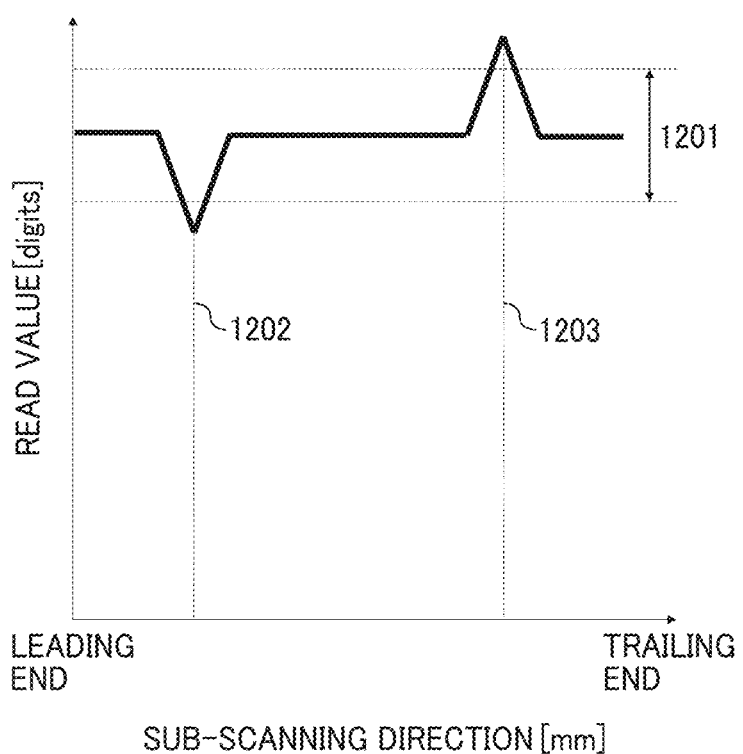
FIG. 12 is a graph illustrating a reading result.

FIG. 12 is a graph illustrating a reading result.

When the brightness changes as illustrated in FIG. 11, the read values are averaged in the main scanning direction. The reading result exhibits a distribution described below, for example.

The image reading device 30 reads the dark area 1101 and obtains a first read value 1202 that is lower than the average.

The image reading device 30 reads the bright area 1102 and obtains a second read value 1203 that is higher than the average.

Now, a description is given of a case in which a range to be determined as normal is set to a normal range 1201 in advance with respect to the reading result described above. For example, the normal range 1201 is determined by, e.g., an allowable value set in advance with respect to the average.

Since the normal range 1201 is determined by, e.g., the average, the influence of changes in brightness between different types of the sheets S is reduced. On the other hand, the read value may be outside the normal range 1201 due to rapid changes such as the first read value 1202 and the second read value 1203. Such a read value may cause the image reading device 30 to erroneously detect the abnormality despite of no contamination.

To prevent such a situation, the criterion for determining whether the inspection result is normal or abnormal is desirably set based on a result of learning the reading result in advance. The learning may be performed separately according to, e.g., the type, size, and thickness of the sheet S. For example, the learning is implemented by artificial intelligence (AI).

Figure 13:
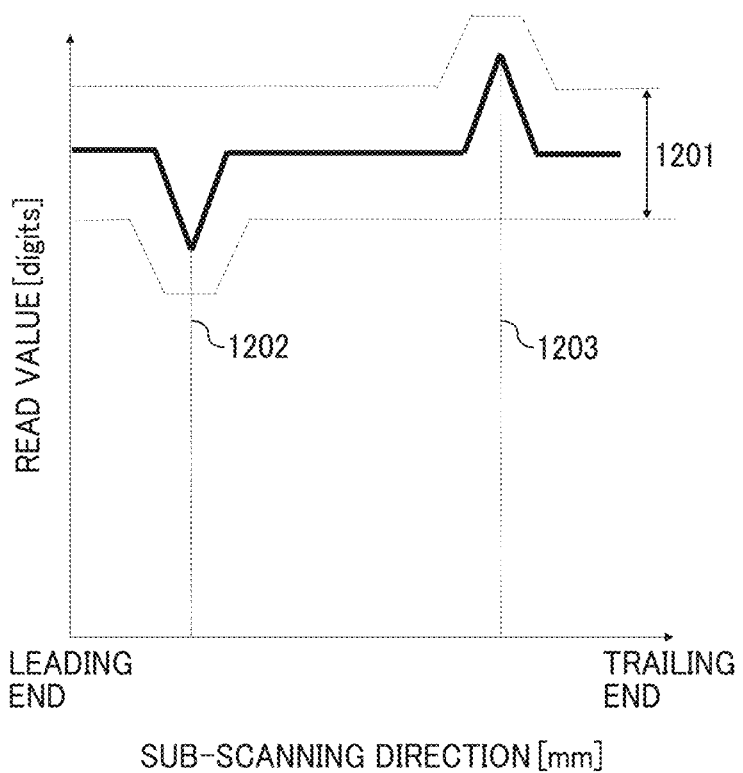
FIG. 13 is a diagram illustrating a normal range set based on a learning result.

FIG. 13 is a diagram illustrating a normal range set based on a learning result.

The normal range 1201 illustrating FIG. 13 is different from the normal range 1201 illustrated in FIG. 12 around the first read value 1202 and the second read value 1203.

In the present example, the background is black. The brightness as illustrated in FIG. 11 is acquired by, e.g., a line sensor. The boundary between the sheet S and the background is determined by, e.g., the difference in brightness of reflected light. The area of the sheet S is thus specified.

The learning is performed so as not to determine a rapidly changing read value such as the first read value 1202 or the second read value 1203 as an abnormality. Specifically, the image reading device 30 scans the sheet S to acquire the profile in advance. With such a profile acquired, the image reading device 30 learns a change in brightness, for example. The image reading device 30 performs setting to widen the normal range based on the learning result as illustrated in FIG. 13. Accordingly, the image reading device 30 reduces erroneous detection.

The image reading device 30 may change the determination criterion as described below, based on the learning result.

Figure 14:
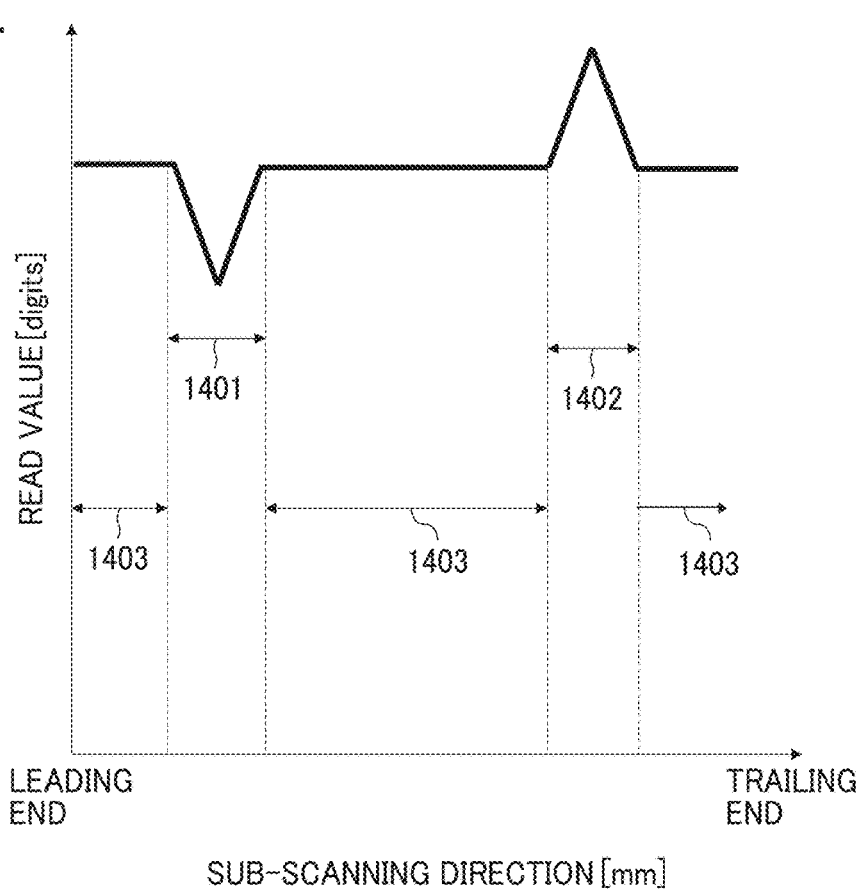
FIG. 14 is a graph illustrating an example of changing a determination criterion based on a learning result.

FIG. 14 is a graph illustrating an example of changing the determination criterion based on a learning result.

Now, a description is given of a case in which the same result as the result illustrated in FIG. 12 is obtained.

A first read area 1401 refers to an area in the vicinity where the first read value 1202 is obtained. A second read area 1402 refers to an area in the vicinity where the second read value 1203 is obtained. A third read area 1403 refers to an area that is neither the first read area 1401 nor the second read area 1402.

Based on the learning result, the image reading device 30 performs determination for the first read area 1401 and the second read area 1402 based on a criterion different from a criterion for the third read area 1403. Specifically, the image reading device 30 inspects the first read area 1401 and the second read area 1402 at an inspection level different from an inspection level for the third read area 1403.

A specific area may be often subjected to erroneous detection compared to the overall average. In the following description, an area that is often subjected to erroneous detection may be referred to as a "specific area." In other words, the inspection result of the specific area tends to be poor compared with the inspection result of an area other than the specific area.

For example, the specific area may be determined or presumed by a mechanical layout. In other words, the specific area may be often specified at, e.g., a designing stage. For this reason, the image reading device 30 stores, in advance, the specific area specified in, e.g., design, in the memory. For example, the image reading device 30 stores the specific area in the form of table data.

The image reading device 30 may change the criterion according to the specific area. Specifically, the image reading device 30 sets the inspection level to "99%" for an area of 40 mm from the leading end of the sheet S. On the other hand, the image reading device 30 sets the inspection level to "100%" for the other areas. The image reading device 30 thus sets the criterion for the specific area to be lower than the criterion for an area other than the specific area.

When calculating the average, for example, the image reading device 30 may exclude the specific area.

The image reading device 30 performs such an inspection based on the specific area to reduce erroneous detection.

Now, a description is given of an example of disposing a guide.

The image reading device 30 preferably includes a guide 2001. For example, the guide 2001 is disposed at a position illustrated in FIG. 6, 8, or 9. The guide 2001 thus disposed restrains flapping of the sheet S. Since the sheet S is conveyed stably with the guide 2001, the image reading device 30 performs an accurate inspection.

Now, a description is given of some modifications.

Figure 15:
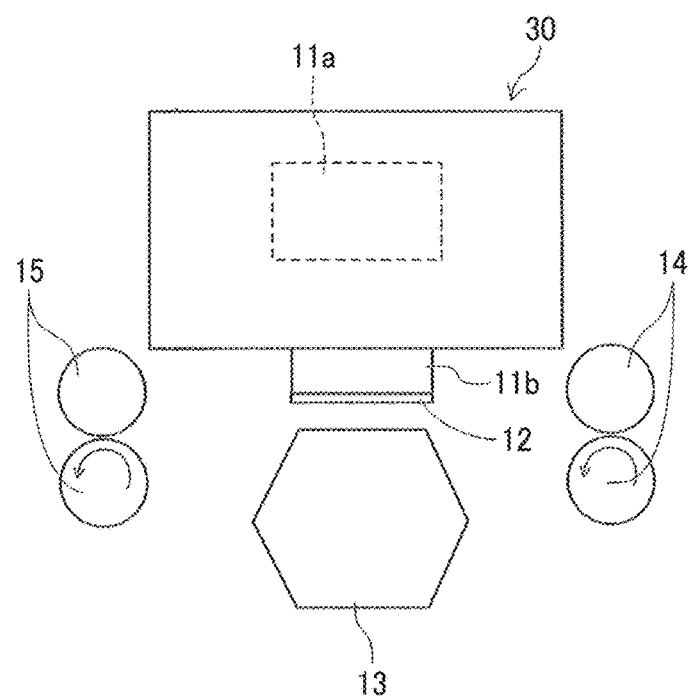
FIG. 15 is a diagram illustrating an image reading device according to a first modification.

FIG. 15 is a diagram illustrating an image reading device according to a first modification. Specifically, FIG. 15 is a side view of the image reading device according to the first modification. The image reading device 30 may have a configuration described below.

The image reading device 30 includes a plurality of imaging elements 11a, an irradiator 11b, and a platen 12. The image reading device 30 further includes a revolver 13, a first conveyance roller pair 14, and a second conveyance roller pair 15.

The irradiator 11b irradiates a sheet material passing through a reading position with light.

The imaging elements 11a performs photoelectric conversion for each pixel to generate image data. The imaging elements 11a are one-dimensionally aligned in a direction perpendicular to the conveyance direction to form a line image sensor.

The revolver 13 is positioned to face the imaging elements 11a across the conveyance passage. The revolver 13 reflects irradiation light with which the sheet material is irradiated at the time of image reading.

The platen 12 is positioned to face the revolver 13. The platen 12 is a transparency. The platen 12 transmits emitted light, light reflected by the revolver 13, and light reflected by the sheet material.

The first conveyance roller pair 14 and the second conveyance roller pair 15 are rotated by a drive motor. In the cleaning, for example, the first conveyance roller pair 14 and the second conveyance roller pair 15 may have different conveyance speeds.

Figure 16:
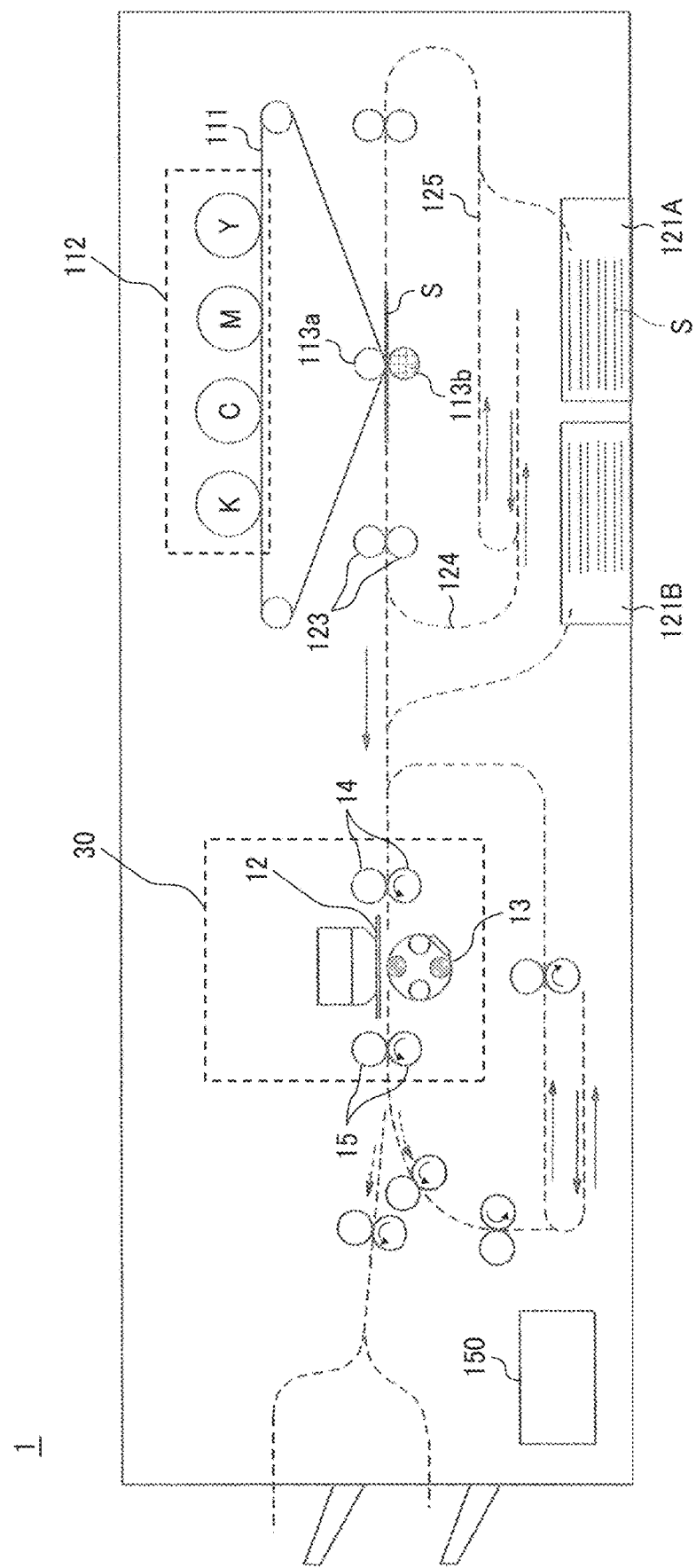
FIG. 16 is a diagram illustrating an image forming apparatus according to a second modification.

FIG. 16 is a diagram illustrating an image forming apparatus according to a second modification. The image forming apparatus 1 including the image reading device 30 may have a configuration described below.

The image forming apparatus 1 includes a control device 150 that controls an overall operation of the image forming apparatus 1 to control a process of forming an image on the sheet S. The control device 150 may include, e.g., a cleaning control device.

The image forming apparatus 1 further includes drum-shaped photoconductors 112 to form images with image forming material such as toner in different colors of yellow (Y), magenta (M), cyan (C), and black (K). For example, the photoconductors 112 are disposed along an intermediate transfer belt 111.

The intermediate transfer belt 111 is entrained around a driving roller and a plurality of driven rollers. Images developed as toner images on the photoconductors 112 are transferred onto the intermediate transfer belt 111 to form a composite toner image. The intermediate transfer belt 111 moves between a primary transfer position and a secondary transfer position at which the composite toner image is transferred onto the sheet S.

The image forming apparatus 1 further includes a transfer roller 113a and an opposed roller 113b at the secondary transfer position. At the secondary transfer position, the composite toner image is transferred from the intermediate transfer belt 111 onto the sheet S. A gap is formed between the transfer roller 113a and the opposed roller 113b, allowing the intermediate transfer belt 111 and the sheet S to be sandwiched between the transfer roller 113a and the opposed roller 113b and the sheet S to pass through the gap. The image is transferred onto the sheet S conveyed through the gap in the conveyance direction, which is a sub-scanning direction, while being sandwiched between the transfer roller 113a and the opposed roller 113b.

The sheet S is fed from a first feed tray 121A or a second feed tray 121B.

The sheet S bearing the image on the front side is conveyed to a fixing roller pair 123, which fixes the image onto the front side of the sheet S. After the fixing, the sheet S is conveyed to a conveyance passage switching device 124, which reverses the traveling direction of the sheet S. Thereafter, the sheet S is conveyed to a reversing path 125. After the sheet S is conveyed along the reversing path 125, another image is formed on the back side of the sheet S. Like the front side of the sheet S, the back side of the sheet S is subjected to the fixing and the inspection.

Figure 17:
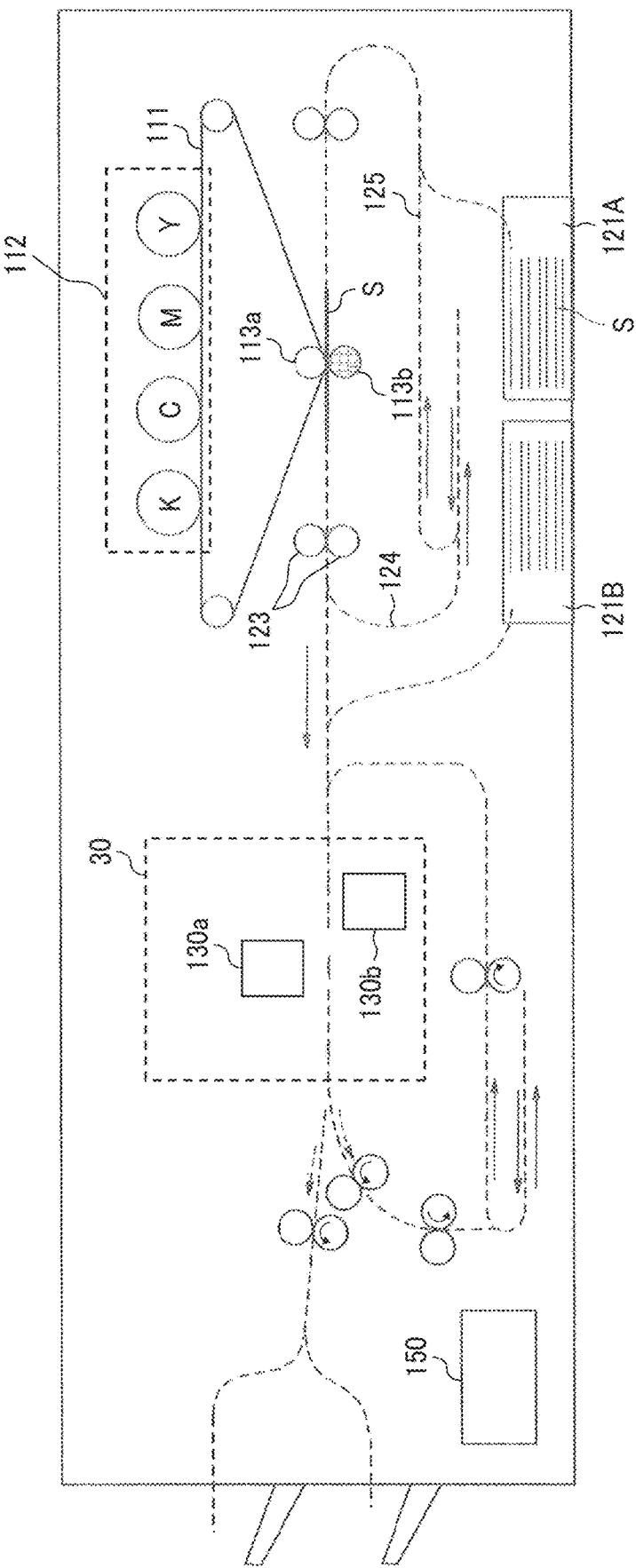
FIG. 17 is a diagram illustrating an image forming apparatus according to a third modification.

FIG. 17 is a diagram illustrating an image forming apparatus according to a third modification. The image forming apparatus 1 illustrated in FIG. 17 is different from the image forming apparatus 1 illustrated in FIG. 16 in the configuration of the image reading device 30.

Figure 18:
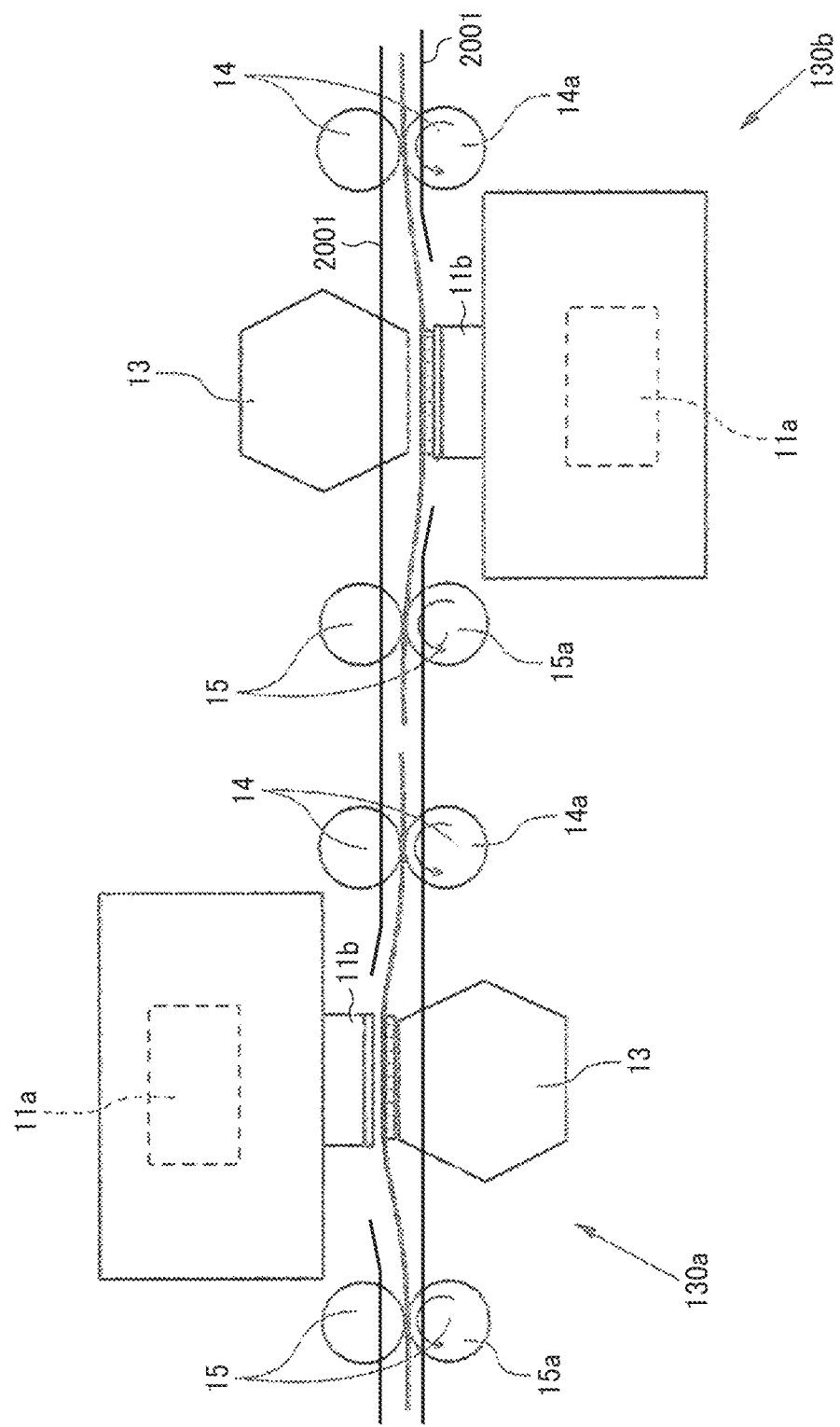
FIG. 18 is a diagram illustrating a first-side reader and a second-side reader included in the image reading device of FIG. 17.

FIG. 18 is a diagram illustrating a first-side reader and a second-side reader included in the image reading device 30 of FIG. 17. Specifically, a first-side reader 130a is a downstream reader in the conveyance direction; whereas a second-side reader 130b is an upstream reader in the conveyance direction.

Now, a description is given of a case in which the first-side reader 130a and the second-side reader 130b have substantially the same hardware configuration.

The first-side reader 130a includes the imaging elements 11a, the irradiator 11b, the revolver 13, the first conveyance roller pair 14, and the second conveyance roller pair 15.

The first-side reader 130a reads an image in synchronization with the movement of the sheet S passing through the reading position. In the example illustrated in FIG. 18, the first-side reader 130a reads an image formed on the front side of the sheet S; whereas the second-side reader 130b reads an image formed on the back side of the sheet S.

The revolver 13 reflects irradiation light with which the sheet S is irradiated at the time of image reading.

The first conveyance roller pair 14 includes a first driving roller 14a that rotates to convey the sheet S.

The second conveyance roller pair 15 includes a second driving roller 15a that rotates to convey the sheet S.

The first-side reader 130a preferably includes the guide 2001.

The image reading device 30 includes the first-side reader 130a and the second-side reader 130b. The first-side reader 130a and the second-side reader 130b allows the image reading device 30 to read the front and back sides of the sheet S almost simultaneously.

In another example, the first-side reader 130a may be disposed upstream in the conveyance direction; whereas the second-side reader 130b may be disposed downstream in the conveyance direction.

Now, a description is given of a functional configuration.

Figure 19:
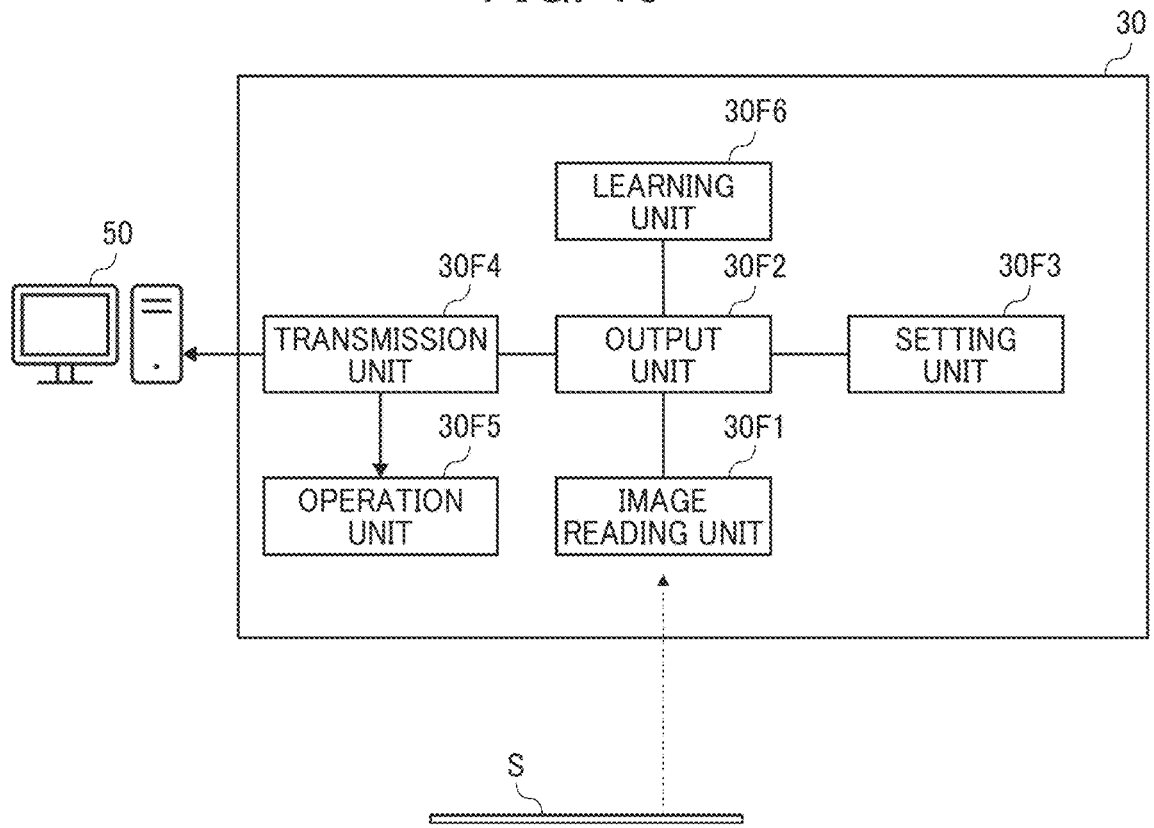
FIG. 19 is a diagram illustrating a functional configuration of an image reading device.

FIG. 19 is a diagram illustrating a functional configuration of the image reading device 30.

For example, the image reading device 30 includes, e.g., an image reading unit 30F1, an output unit 30F2, and a setting unit 30F3. The image reading device 30 may further include, e.g., a transmission unit 30F4, an operation unit 30F5, and a learning unit 30F6.

The image reading unit 30F1 performs an image reading procedure to read an image on a recording medium. For example, the image reading unit 30F1 is implemented by the sensor 203.

The output unit 30F2 performs an output procedure to inspect the image and output an inspection result, based on the second area. For example, the output unit 30F2 is implemented by the CPU 32.

The setting unit 30F3 performs a setting procedure to exclude the first area from an area to be inspected, based on the type of the recording medium or the position of the recording medium with respect to the reading position, to set or determine the second area. For example, the setting unit 30F3 is implemented by the CPU 32.

The transmission unit 30F4 performs a transmission procedure to transmit the inspection result to, e.g., the operation unit 30F5 or a display terminal 50. For example, the transmission unit 30F4 is implemented by a communication device.

The operation unit 30F5 performs an operation procedure to receive an operation from a user or output a screen for the user. For example, the operation unit 30F5 is implemented by the operation display 25.

The learning unit 30F6 performs a learning procedure to learn a reading result. For example, the learning unit 30F6 is implemented by the CPU 32.

The display terminal 50 is an information processor such as a tablet or a personal computer (PC) that is connected via a network or a cable.

The image reading device 30 excludes the first area from the area to be inspected to determine the second area. The image reading device 30 performs an inspection based on the second area thus determined, to prevent erroneous detection in the image inspection.

Now, a description is given of an overall process.

Figure 20:
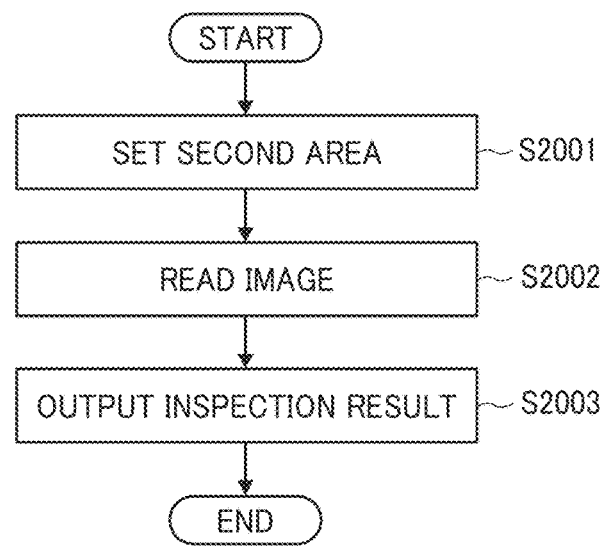
FIG. 20 is a flowchart of an overall process.

FIG. 20 is a flowchart of an overall process.

In step S2001, the image reading device 30 excludes the first area from an area to be inspected and determines the second area to be inspected.

In step S2002, the image reading device 30 reads an image formed on a recording medium.

In step S2003, the image reading device 30 inspects the image and outputs an inspection result, based on the second area.

Now, a description is given of some other embodiments of the present disclosure.

The image forming apparatus is not limited to the configurations described above. For example, the image forming apparatus may include devices other than the devices described above. In addition, the arrangement of the devices may be other than the arrangements illustrated in the drawings.

The recording medium may be other than the sheet S, which is a sheet of plain paper. Alternatively, for example, the recording medium may be a sheet of coated paper, a sheet of label paper, an overhead projector sheet, a film, or a flexible thin plate. In other words, the recording medium is made of, e.g., a material to which ink droplets are at least temporarily adherable, a material to which ink droplets adheres and are fixed, or a material to which ink droplets adheres and permeate. Specific examples of a recording material or formation made of such a material include, but are not limited to, a recording medium such as a sheet, a film, or cloth, an electronic component such as an electronic substrate or a piezoelectric element, which may be referred to as a piezoelectric component, layered powder, an organ model, and a testing cell. In short, the recording medium is made of any material to which liquid is adherable, such as paper, thread, fiber, fabric, leather, metal, plastic, glass, wood, ceramic, or a combination thereof.

The device may be a plurality of devices. In other words, each device may have a configuration in which a plurality of devices perform processing in a distributed manner, in a redundant manner, or in parallel. On the other hand, each device may be integrated. In other words, the plurality of devices described above may be implemented by one device.

The image reading method as described above may be implemented by an image reading program. In other words, the image reading program causes devices such as an arithmetic device, a control device, and a storage device included in a computer to operate in cooperation with each other to implement the image reading method. The image reading program may be distributed via, e.g., a computer-readable recording medium or an electric communication line.

According to one aspect of the present disclosure, the erroneous detection is prevented in image inspection.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image reading device comprising:
a sensor configured to read an image on a recording medium; and
circuitry configured to:
inspect the image and output an inspection result; and
exclude an area of the recording medium as a first area from an area to be inspected, based on a type of the recording medium or a position of the recording medium with respect to a reading position at which the sensor reads the image, to determine a second area to be inspected,
the circuitry being configured to output the inspection result based on the second area.

2. The image reading device according to claim 1, further comprising:
a first sandwiching conveyor configured to sandwich and convey the recording medium at a position upstream from the sensor in a recording medium conveyance direction; and
a second sandwiching conveyor configured to sandwich and convey the recording medium at a position downstream from the sensor in the recording medium conveyance direction,
wherein the circuitry is configured to output the inspection result based on the second area in response to one of the first sandwiching conveyor and the second sandwiching conveyor sandwiching the recording medium.

3. The image reading device according to claim 2, wherein the recording medium is conveyed to the first sandwiching conveyor in a direction and the recording medium is conveyed from the first sandwiching conveyor in another direction.

4. The image reading device according to claim 2, wherein the recording medium is conveyed to the second sandwiching conveyor in a direction and the recording medium is conveyed from the second sandwiching conveyor in another direction.

5. The image reading device according to claim 2, further comprising a third sandwiching conveyor configured to sandwich and convey the recording medium at a position downstream from the second sandwiching conveyor in the recording medium conveyance direction,
wherein the circuitry is configured to invalidate an inspection when the third sandwiching conveyor receives the recording medium.

6. The image reading device according to claim 2, further comprising another sandwiching conveyor configured to sandwich and convey the recording medium at a position upstream from the first sandwiching conveyor in the recording medium conveyance direction,
wherein the circuitry is configured to invalidate an inspection when said another sandwiching conveyor outputs the recording medium.

7. The image reading device according to claim 1,
wherein the circuitry is configured to:
learn a reading result provided by the sensor; and
set a criterion to determine whether the inspection result is normal or abnormal, based on a learning result.

8. The image reading device according to claim 7,
wherein the sensor is configured to read images on a plurality of recording media including the recording medium, and
wherein the circuitry is configured to learn for each of the plurality of recording media and change the criterion for each of the plurality of recording media.

9. The image reading device according to claim 1, further comprising a memory that stores a specific area of which the inspection result is poor compared with an inspection result of an area other than the specific area,
wherein the circuitry is configured to:
set a criterion to determine whether the inspection result is normal or abnormal; and
set the criterion for the specific area to be different from the criterion for the area other than the specific area.

10. An image forming apparatus comprising the image reading device according to claim 1.

11. The image reading device according to claim 1, wherein the position of the recording medium with respect to the reading position is based on a portion of the recording medium being unsupported by a sandwiching conveyor.

* * * * *